United States Patent
Nakashima et al.

(10) Patent No.: US 10,450,431 B2
(45) Date of Patent: *Oct. 22, 2019

(54) POLY(METH)ACRYLIMIDE FILM, EASY-ADHESION FILM USING SAME, AND METHOD FOR MANUFACTURING SUCH FILMS

(71) Applicant: RIKEN TECHNOS CORPORATION, Tokyo (JP)

(72) Inventors: Kohei Nakashima, Tokyo (JP);
Kazutaka Yamada, Tokyo (JP);
Hidemasa Sugimoto, Tokyo (JP);
Yoshihiro Zennyoji, Tokyo (JP)

(73) Assignee: RIKEN TECHNOS CORPORATION (JP)

( * ) Notice: Subject to any disclaimer, the term of this patent is extended or adjusted under 35 U.S.C. 154(b) by 119 days.

This patent is subject to a terminal disclaimer.

(21) Appl. No.: 14/904,025

(22) PCT Filed: Jun. 11, 2014

(86) PCT No.: PCT/JP2014/065440
§ 371 (c)(1),
(2) Date: Jan. 8, 2016

(87) PCT Pub. No.: WO2015/005049
PCT Pub. Date: Jan. 15, 2015

(65) Prior Publication Data
US 2016/0159995 A1    Jun. 9, 2016

(30) Foreign Application Priority Data

Jul. 10, 2013  (JP) ................ 2013-144142
Jul. 10, 2013  (JP) ................ 2013-144143
Jul. 10, 2013  (JP) ................ 2013-144144

(51) Int. Cl.
*B29C 59/16*  (2006.01)
*C08J 5/18*   (2006.01)
(Continued)

(52) U.S. Cl.
CPC ............. *C08J 5/18* (2013.01); *B29C 48/0019* (2019.02); *B29C 48/08* (2019.02); *B29C 48/30* (2019.02);
(Continued)

(58) Field of Classification Search
CPC ..... C08J 5/18; C08J 7/042; C08J 7/047; C08J 7/065; C08J 7/123; B29C 47/0021;
(Continued)

(56) References Cited

U.S. PATENT DOCUMENTS 3,284,425 A * 11/1966 Schröder et al. ......... C08F 8/00
  525/328.2
5,006,582 A    4/1991 Mancinelli
(Continued)

FOREIGN PATENT DOCUMENTS

CN    1614447 A    5/2005
CN    101010603 A  8/2007
(Continued)

OTHER PUBLICATIONS

PCT/JP2014/065440 International Search Report dated Sep. 2, 2014; 5pgs.
(Continued)

*Primary Examiner* — Stella K Yi
(74) *Attorney, Agent, or Firm* — Bracewell LLP; Brad Y. Chin

(57) ABSTRACT

Embodiments of the invention relate to a poly(meth)acrylimide film and a method for manufacturing such a film. At least one embodiment provides a poly(meth)acrylimide film that has (i) a total light transmittance of over 90% and
(Continued)

(ii) haze of 2.0% or less. This film preferably has retardation of less than 50 nm. The method for manufacturing this film includes the following steps: (A) using a device provided with an extruder and a T die, a poly(meth)acrylimide molten film is continuously extruded from the T die; and (B) the poly(meth)acrylimide molten film is loaded by being fed between a rotating or circulating first mirrored-surface body and a rotating or circulating second mirrored-surface body, and then the film is pressed. During these steps, (C) the surface temperature of the first mirrored-surface body is in the range 100-200° C., and (D) the surface temperature of the second mirrored-surface body is in the range 20-200° C.

10 Claims, 1 Drawing Sheet

(51) Int. Cl.
| | |
|---|---|
| *B29C 59/10* | (2006.01) |
| *B29C 71/04* | (2006.01) |
| *B32B 27/06* | (2006.01) |
| *B32B 27/28* | (2006.01) |
| *B32B 27/30* | (2006.01) |
| *C08J 7/04* | (2006.01) |
| *C08J 7/06* | (2006.01) |
| *C08J 7/12* | (2006.01) |
| *B29C 48/08* | (2019.01) |
| *B29C 48/00* | (2019.01) |
| *B29C 48/30* | (2019.01) |
| *B29C 48/92* | (2019.01) |
| *B29C 48/305* | (2019.01) |
| *B29C 48/40* | (2019.01) |
| *B29C 48/88* | (2019.01) |
| *B29K 79/00* | (2006.01) |
| *B29L 7/00* | (2006.01) |
| *B29C 48/27* | (2019.01) |

(52) U.S. Cl.
CPC .......... *B29C 48/305* (2019.02); *B29C 48/402* (2019.02); *B29C 48/9145* (2019.02); *B29C 48/92* (2019.02); *B29C 59/10* (2013.01); *B29C 71/04* (2013.01); *B32B 27/06* (2013.01); *B32B 27/281* (2013.01); *B32B 27/308* (2013.01); *C08J 7/042* (2013.01); *C08J 7/047* (2013.01); *C08J 7/065* (2013.01); *C08J 7/123* (2013.01); *B29C 48/022* (2019.02); *B29C 48/2715* (2019.02); *B29C 48/914* (2019.02); *B29C 48/918* (2019.02); *B29C 2948/92704* (2019.02); *B29K 2079/08* (2013.01); *B29L 2007/008* (2013.01); *B32B 2457/20* (2013.01); *C08J 2333/24* (2013.01); *C08J 2333/26* (2013.01); *C08J 2433/08* (2013.01); *C08J 2475/04* (2013.01)

(58) Field of Classification Search
CPC ... B29C 47/0059; B29C 47/14; B29C 47/402; B29C 47/885; B29C 47/92; B29C 59/10; B29C 71/04; B29C 27/06; B32B 27/06; B32B 27/281; B32B 27/308
See application file for complete search history.

(56) References Cited

U.S. PATENT DOCUMENTS

| | | |
|---|---|---|
| 5,225,470 A | 7/1993 | Mancinelli |
| 6,842,288 B1 | 1/2005 | Liu et al. |
| 2006/0134362 A1 | 6/2006 | Lu et al. |
| 2007/0076166 A1 | 4/2007 | Kobuchi et al. |
| 2009/0166917 A1 | 7/2009 | Maekawa et al. |
| 2013/0143999 A1 | 6/2013 | Tanaka et al. |
| 2014/0232027 A1* | 8/2014 | Pisula et al. ..... B29D 11/00663 264/1.27 |
| 2014/0370307 A1 | 12/2014 | Hao et al. |

FOREIGN PATENT DOCUMENTS

| | | | |
|---|---|---|---|
| CN | 101462353 | A | 6/2009 |
| CN | 101490176 | A | 7/2009 |
| CN | 102019680 | * | 4/2011 |
| CN | 102019680 | A | 4/2011 |
| JP | 60-208337 | A | 10/1985 |
| JP | 04019142 | A | 1/1992 |
| JP | 6-166714 | A | 6/1994 |
| JP | 6-256537 | A | 9/1994 |
| JP | H0792306 | A | 4/1995 |
| JP | 9-159804 | A | 6/1997 |
| JP | 11-255923 | A | 9/1999 |
| JP | H11255923 | A | 9/1999 |
| JP | 2000-280268 | A | 10/2000 |
| JP | 2000280268 | * | 10/2000 |
| JP | 2000327836 | A | 11/2000 |
| JP | 2002-338702 | A | 11/2002 |
| JP | 2002338702 | A | 11/2002 |
| JP | 2003019759 | A | 1/2003 |
| JP | 2005213410 | A | 8/2005 |
| JP | 2006-182879 | A | 7/2006 |
| JP | 2006-309033 | A | 11/2006 |
| JP | 2006-328331 | A | 12/2006 |
| JP | 2006-328334 | A | 12/2006 |
| JP | 2007047605 | A | 2/2007 |
| JP | 2007093927 | A | 4/2007 |
| JP | 2007-137022 | A | 6/2007 |
| JP | 2008019403 | A | 1/2008 |
| JP | 2008-181091 | A | 8/2008 |
| JP | 2008-255175 | A | 10/2008 |
| JP | 2008-277022 | A | 11/2008 |
| JP | 2009-107180 | A | 5/2009 |
| JP | 2009107180 | A | 5/2009 |
| JP | 2009-137206 | A | 6/2009 |
| JP | 2009-139660 | A | 6/2009 |
| JP | 2009162848 | A | 7/2009 |
| JP | 2009191167 | A | 8/2009 |
| JP | 2009244757 | A | 10/2009 |
| JP | 2009-279806 | A | 12/2009 |
| JP | 2009-292871 | A | 12/2009 |
| JP | 2009279806 | A | 12/2009 |
| JP | 2009294261 | A | 12/2009 |
| JP | 2010017874 | A | 1/2010 |
| JP | 2010-64332 | A | 3/2010 |
| JP | 2010064332 | A | 3/2010 |
| JP | 2010-085978 | A | 4/2010 |
| JP | 2010-105188 | A | 5/2010 |
| JP | 2010105188 | A | 5/2010 |
| JP | 2010-162899 | A | 7/2010 |
| JP | 2010-221565 | A | 10/2010 |
| JP | 2010-254742 | A | 11/2010 |
| JP | 2010-284840 | A | 12/2010 |
| JP | 2011-519999 | A | 7/2011 |
| JP | 2012052010 | A | 3/2012 |
| JP | 2012056252 | A | 3/2012 |
| JP | 2013-086273 | A | 5/2013 |
| JP | 2013-176985 | A | 9/2013 |
| JP | 2013-208896 | A | 10/2013 |
| JP | 2013208896 | A | 10/2013 |
| WO | 2012086656 | A1 | 6/2012 |
| WO | 2013128697 | A | 9/2013 |
| WO | 2015072240 | A1 | 5/2015 |

OTHER PUBLICATIONS

CN201480062919.1 Office Action Dated Jun. 1, 2017; 15pgs.
JP2014-115362 Office Action dated Apr. 5, 2016; 10pgs.
JP2014-115361 Office Action dated Mar. 18, 2016; 8pgs.
CN201480039071.0 Office Action dated Dec. 30, 2016; 17 pgs.
CN201480039071.0 Office Action dated Jan. 9, 2018; 42 pages.

(56) References Cited

OTHER PUBLICATIONS

CN201480062919.1 Office Action dated Nov. 27, 2017; 11 pgs.
JP2014-140158 Office Action dated Mar. 8, 2018; 12 pgs.
TW103139023 Office Action dated Mar. 28, 2018; 12 pages.
KR1020167007114 Office Action dated Feb. 21, 2018; 13 pages.
CN201480039071.0 Office Action dated Jul. 21, 2017; 39 pgs.
CN201480051437.6 Office Action dated Aug. 2, 2017; 16 pgs.
KR1020167007114 Office Action dated Aug. 25, 2017; 13 pgs.
TW103139023 Decision of Rejection dated Aug. 3, 2018; 8 pgs.
CN201480039071.0 Office Action dated Nov. 2, 2018; 13 pgs.
CN201580015273.6 Office Action dated Feb. 3, 2019; 16 pgs.
TW103139023 Office Action dated May 29, 2019; 12 pgs.
TW104127313 Office Action dated Oct. 17, 2018; 12 pgs.

* cited by examiner

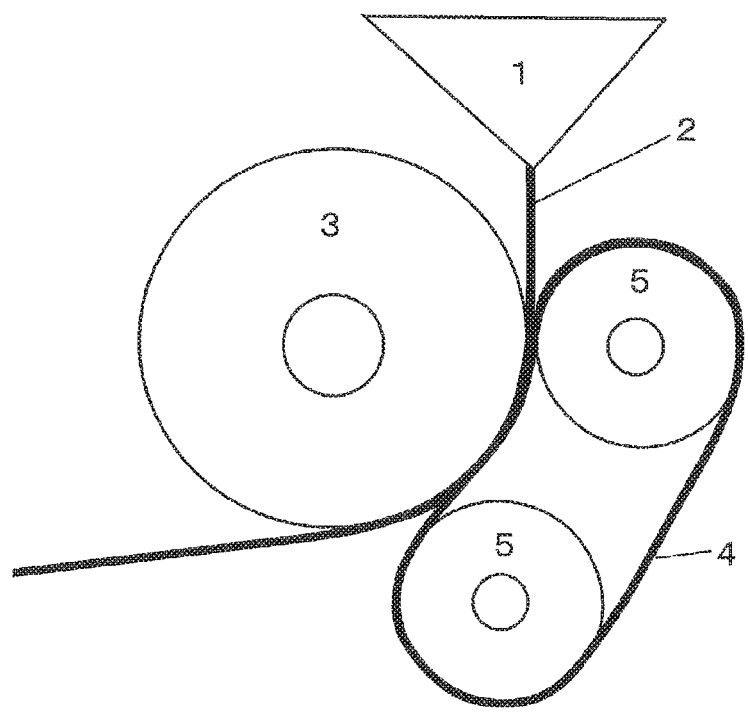

POLY(METH)ACRYLIMIDE FILM, EASY-ADHESION FILM USING SAME, AND METHOD FOR MANUFACTURING SUCH FILMS

CROSS REFERENCE TO RELATED APPLICATION

This application claims the benefit of and priority to PCT/JP2014/065440 filed on Jun. 11, 2014, entitled (translation), "POLY(METH)ACRYLIMIDE FILM, EASY-ADHESION FILM USING THE SAME, AND METHOD FOR MANUFACTURING SUCH FILMS," which claims the benefit of and priority to Japanese Patent Applications No. 2013-144142, 2013-144143, and 2013-144144, each filed on Jul. 10, 2013, all of which are hereby incorporated by reference in their entirety into this application.

BACKGROUND

Field of the Invention

Embodiments of the invention relate to a poly(meth)acrylimide film, an easily-adhesive film using the same, and methods for producing these, particularly to a poly(meth)acrylimide film, which is excellent in surface smoothness, transparency and appearance, and low in retardation; an easily-adhesive poly(meth)acrylimide film, which is excellent in adhesive strength with a hard coat, and suitable as a base material of touch panel display face plates and transparent conductive substrates, and methods for producing these.

Description of the Related Art

In recent years, touch panels have come into wide use which are installed on image display apparatuses, such as liquid crystal displays, plasma displays and electroluminescence displays, and on which input can be made by touch with a finger, a pen or the like while a display is being looked at.

Members having glass as base materials have conventionally been used for touch panel display face plates and transparent conductive substrates, since they meet required properties such as heat resistance, dimensional stability, high transparency, high surface hardness and high rigidity. However, the glass has the problems of being low in impact resistance to be liable to be broken, low in processability, difficult in handling, high in specific gravity and weighty, and difficult in meeting requirements of face curving and flexibilization of displays, and the like.

Materials as a substitute for glass are actively being studied; there are proposed many hard coat-laminated films in which a hard coat excellent in surface hardness and abrasion resistance is formed on the surface of a transparent resin film base material of triacetyl cellulose, polyethylene terephthalate, polycarbonate, polymethyl methacrylate or norbornene polymer or the like (for example, see JP 2013-208896 A). However, their heat resistance and dimensional stability are insufficient.

Particularly with respect to substitutes of transparent conductive substrates, it is desired that when a transparent conductive film is formed, the process temperature is kept high to increase the degree of crystallinity of the transparent conductive film thereby lowering the surface resistance. However, employment of hard coat-laminated films formed from the transparent resin film base material has not been progressed for the following reasons: since the heat resistance of the transparent resin film base material is insufficient, the process temperature cannot be raised; since the heat resistance of the transparent resin film base material is insufficient, a thin film transistor cannot be further formed on the transparent conductive laminated film; and the like. It is the present situation that for transparent conductive substrates, glass is exclusively used.

A poly(meth)acrylimide has been studied as a transparent resin film base material. The poly(meth)acrylimide is a thermoplastic resin which maintains characteristics of acrylic resins of high transparency, high surface hardness and high rigidity, also has characteristics of polyimide resins introduced thereto of excellent heat resistance and dimensional stability, and is improved in a drawback of coloration from light yellow to reddish brown.

Such a poly(meth)acrylimide is disclosed, for example, in JP 2011-519999 A. The usual T-die extrusion method, however, cannot provide a poly(meth)acrylimide film excellent in surface smoothness, transparency and appearance. Further the adhesive strength of the poly(meth)acrylimide film with a hard coat is not always satisfactory.

JP 2009-292871 A discloses "an acryl film thin in film thickness and good in die line, surface roughness and film wrinkle, and a method for producing the same." Since a poly(meth)acrylimide has properties of an acrylic resin, attempts have been made to apply the technology of the conventional art, but still no poly(meth)acrylimide film excellent in surface smoothness, transparency and appearance could be obtained.

SUMMARY

Embodiments of the invention have been achieved in consideration of the situation as described above, and provide a poly(meth)acrylimide film excellent in surface smoothness, transparency and appearance and low in retardation; an easily-adhesive poly(meth)acrylimide film excellent in the adhesive strength with a hard coat and suitable as a base material of transparent conductive substrates; a hard coat-laminated poly(meth)acrylimide film formed from these films; and an image display apparatus member containing these films. The "image display apparatus" mentioned here includes image display apparatuses having a touch panel function and image display apparatuses having no touch panel function.

Embodiments of the invention also provide a method for producing a poly(meth)acrylimide film excellent in surface smoothness, transparency and appearance and low in retardation.

Embodiments of the invention also provide a method for producing an easily-adhesive poly(meth)acrylimide film excellent in the adhesive strength with a hard coat and capable of being suitably used as a base material of touch panel display face plates and transparent conductive substrates.

Embodiments of the invention include a first embodiment (items [1] to [11]), a second embodiment (items [12] to [26]) and a third embodiment (items [27] to [34]) of the invention.

[1] A poly(meth)acrylimide film, wherein the poly(meth)acrylimide film meets the following properties (i) and (ii): (i) a total light transmittance of higher than 90%; and (ii) a haze of 2.0% or lower.

[2] The poly(meth)acrylimide film according to the above [1], wherein the poly(meth)acrylimide film further meets the following property (iii): (iii) a retardation of lower than 50 nm.

[3] The poly(meth)acrylimide film according to the above [1] or [2], wherein at least one surface of the poly(meth) acrylimide film has a wetting index of 50 mN/m or higher.

[4] An easily-adhesive film, wherein the easily-adhesive film has an anchor coat formed on at least one surface of the poly(meth)acrylimide film according to any one of the above [1] to [3].

[5] The easily-adhesive film according to the above [4], wherein the anchor coat comprises a silane coupling agent having an amino group.

[6] The easily-adhesive film according to the above [4], wherein the anchor coat is a thermoplastic urethane anchor coat.

[7] A hard coat-laminated film, wherein the hard coat-laminated film has a hard coat formed on at least one surface of the poly(meth)acrylimide film according to any one of the above [1] or [2].

[8] A hard coat-laminated film, wherein the hard coat-laminated film has a hard coat formed on a surface of the poly(meth)acrylimide film according to the above [3], the surface having a wetting index of 50 mN/m or higher.

[9] The hard coat-laminated film according to any one of the above [4] to [6], wherein the hard coat-laminated film further has a hard coat formed on the anchor coat.

[10] The hard coat-laminated film according to any one of the above [7] to [9], wherein a surface of the hard coat has a pencil hardness of 7H or higher.

[11] An image display apparatus member, comprising the film according to any one of the above [1] to [10].

[12] A method for producing a poly(meth)acrylimide film, comprising the steps of: (A) continuously extruding, with an apparatus equipped with an extruder and a T die, a molten film of a poly(meth)acrylimide from the T die; and (B) feeding and pressing the molten film of the poly(meth)acrylimide between a first rotating or circulating mirror-finished body and a second rotating or circulating mirror-finished body, wherein (C) the first mirror-finished body has a surface temperature of 100 to 200° C.; and (D) the second mirror-finished body has a surface temperature of 20 to 200° C.

[13] The method according to the above [12], wherein the first mirror-finished body is a rotating mirror-finished roll; and the second mirror-finished body is a mirror-finished belt circulating along an outer peripheral surface of the mirror-finished roll.

[14] The method according to the above [12], wherein the first mirror-finished body is a mirror-finished roll; and the second mirror-finished body is a mirror-finished roll.

[15] A poly(meth)acrylimide film, being obtained by the method according to any one of the above [12] to [14].

[16] The poly(meth)acrylimide film according to the above [15], wherein the poly(meth)acrylimide film meets the following properties (i) and (ii): (i) a total light transmittance of higher than 90%; and (ii) a haze of 2.0% or lower.

[17] The poly(meth)acrylimide film according to the above [16], wherein the poly(meth)acrylimide film further meets the following property (iii): (iii) a retardation of lower than 50 nm.

[18] The poly(meth)acrylimide film according to any one of the above [15] to [17], wherein at least one surface of the poly(meth)acrylimide film has a wetting index of 50 mN/m or higher.

[19] An easily-adhesive film, wherein the easily-adhesive film has an anchor coat formed on at least one surface of the poly(meth)acrylimide film according to any one of the above [15] to [18].

[20] The easily-adhesive film according to the above [19], wherein the anchor coat comprises a silane coupling agent having an amino group.

[21] The easily-adhesive film according to the above [19], wherein the anchor coat is a thermoplastic urethane anchor coat.

[22] A hard coat-laminated film, wherein the hard coat-laminated film has a hard coat formed on at least one surface of the poly(meth)acrylimide film according to any one of the above [15] to [17].

[23] A hard coat-laminated film, wherein the hard coat-laminated film has a hard coat formed on the surface having a wetting index of 50 mN/m or higher of the poly(meth)acrylimide film according to the above [18].

[24] The hard coat-laminated film according to any one of the above [19] to [21], wherein the hard coat-laminated film further has a hard coat formed on the anchor coat.

[25] The hard coat-laminated film according to any one of the above [22] to [24], wherein a surface of the hard coat has a pencil hardness of 7H or higher.

[26] An image display apparatus member, comprising the film according to any one of the above [15] to [25].

[27] A method for producing an easily-adhesive poly(meth)acrylimide film, comprising the steps of: (1) subjecting at least one surface of a poly(meth)acrylimide film to a corona discharge treatment; and (2) forming, as an easily-adhesive surface, an anchor coat comprising a silane coupling agent having an amino group on the treated surface of the poly(meth)acrylimide film having been subjected to the corona discharge treatment in the above step (1).

[28] An easily-adhesive poly(meth)acrylimide film, being obtained by the method according to the above [27].

[29] The easily-adhesive poly(meth)acrylimide film according to the above [28], wherein the poly(meth)acrylimide film to be used in the step (1) meets the following properties (i) and (ii): (i) a total light transmittance of higher than 90%; and (ii) a haze of 2.0% or lower.

[30] The easily-adhesive poly(meth)acrylimide film according to the above [29], wherein the poly(meth)acrylimide film to be used in the step (1) further meets the following property (iii): (iii) a retardation of lower than 50 nm.

[31] The easily-adhesive poly(meth)acrylimide film according to any one of the above [28] to [30], wherein at least one surface of the poly(meth)acrylimide film to be used in the step (1) has a wetting index of 50 mN/m or higher.

[32] A hard coat-laminated film, wherein the hard coat-laminated film further has a hard coat formed on the easily-adhesive poly(meth)acrylimide film according to any one of the above [28] to [31].

[33] The hard coat-laminated film according to the above [32], wherein a surface of the hard coat has a pencil hardness of 7H or higher.

[34] An image display apparatus member, comprising a film according to any one of the above [28] to [33].

BRIEF DESCRIPTION OF THE DRAWINGS

FIG. 1 is a conceptual view illustrating one example of a production method according to an embodiment of the invention.

DETAILED DESCRIPTION

1. A Poly(Meth)Acrylimide Film, an Easily-Adhesive Film, and a Hard Coat-Laminated Film First, the first embodiment of the invention will be described.

A poly(meth)acrylimide film according to the first embodiment of the invention meets the following properties (i) and (ii). The poly(meth)acrylimide film preferably meets (i) to (iii). Therefore, the poly(meth)acrylimide film can be used as a base material of touch panel display face plates and transparent conductive substrates.

(i) The total light transmittance: higher than 90%
(ii) The haze: 2.0% or lower
(iii) The retardation: lower than 50 nm According to at least one embodiment, when the total light transmittance of the poly(meth)acrylimide film is higher than 90%, it can suitably be used as a base material of touch panel display face plates and transparent conductive substrates. A higher total light transmittance of the poly(meth)acrylimide film is preferable; and 92% or higher is more preferable. The total light transmittance herein can be measured according to JIS K7361-1:1997.

According to at least one embodiment, when the haze of the poly(meth)acrylimide film is 2.0% or lower, it can suitably be used as a base material of touch panel display face plates and transparent conductive substrates. A lower haze of the poly(meth)acrylimide film is preferable; and 1.5% or lower is more preferable. The haze herein can be measured according to JIS K7136-2000.

According to at least one embodiment, when the retardation of the poly(meth)acrylimide film is lower than 50 nm, it can remarkably suitably be used as a base material of touch panel display face plates and transparent conductive substrates. A lower retardation of the poly(meth)acrylimide film is preferable; 40 nm or lower is more preferable; and 30 nm or lower is still more preferable. The retardation herein can be measured according to a parallel Nicol rotation method.

According to at least one embodiment, the poly(meth)acrylimide is a resin which maintains characteristics of acrylic resins of high transparency, high surface hardness and high rigidity, also has characteristics of polyimide resins introduced thereto of excellent heat resistance and dimensional stability, and is improved in a drawback of coloration from light yellow to reddish brown. Moreover it also has thermoplasticity.

A poly(meth)acrylimide herein refers to a polyacrylamide or a polymethacrylimide.

A poly(meth)acrylimide to be used in order to obtain the film according to an embodiment of the invention is not especially limited as long as having a high transparency and exhibiting no coloration for the purpose of being used as a transparent resin film base material, and any poly(meth)acrylimide can be used.

According to at least one embodiment, preferable poly(meth)acrylimides include ones having a yellowness index (which is measured according to JIS K7105:1981) of 3 or lower. The yellowness index of the poly(meth)acrylimide is preferably 2 or lower, and more preferably 1 or lower. Further from the viewpoint of extrusion load and molten film stability, preferable poly(meth)acrylimides include ones having a melt mass flow rate (which is measured according to ISO1133 under the condition of 260° C. and 98.07 N) of 0.1 to 20 g/10 min. The melt mass flow rate of the poly(meth)acrylimide is more preferably 0.5 to 10 g/10 min. Further the glass transition temperature of the poly(meth)acrylimide is preferably 150° C. or higher, and more preferably 170° C. or higher.

Commercially available examples of the poly(meth)acrylimide include "ACRYMID TT70 (trade name)" of Evonik.

According to at least one embodiment, the poly(meth)acrylimide can further contain, within the limits of not being contrary to the purpose of the invention, thermoplastic resins other than poly(meth)acrylimides; pigments, inorganic fillers, organic fillers, resin fillers; additives such as lubricants, antioxidants, weather-resistance stabilizers, thermal stabilizers, mold releasing agents, antistatic agents and surfactants; and the like. The amount of these optional components blended is, with respect to 100 parts by mass of the poly(meth)acrylimide, usually about 0.01 to 10 parts by mass.

According to at least one embodiment, a method for producing a poly(meth)acrylimide film according to the first embodiment of the invention is not especially limited, and the poly(meth)acrylimide film can be produced, for example, by a method of the second embodiment of the invention described later.

According to at least one embodiment, the thickness of the poly(meth)acrylimide film is not especially limited, and can be any thickness as desired. In the case where the poly(meth)acrylimide film is laminated on another substrate such as an acrylic plate and used, from the viewpoint of the handleability, the thickness may be usually 20 µm or larger, and preferably 50 µm or larger. Further from the viewpoint of the economic efficiency, the thickness may be usually 250 µm or smaller, and preferably 150 µm or smaller. On the other hand, in the case where the poly(meth)acrylimide film is used as a display face plate, from the viewpoint of maintaining the rigidity, the thickness may be usually 100 µm or larger, preferably 200 µm or larger, and more preferably 300 µm or larger. Further from the viewpoint of meeting the requirement of thickness reduction of touch panels, the thickness may be usually 1,500 µm or smaller, preferably 1,200 µm or smaller, and more preferably 1,000 µm or smaller.

According to at least one embodiment, the poly(meth)acrylimide film can be made into an easily-adhesive film by forming an anchor coat as an easily-adhesive surface on at least one surface of the poly(meth)acrylimide film. It can be made into a hard coat-laminated film by further forming a hard coat on the anchor coat.

Further the poly(meth)acrylimide film according to an embodiment of the invention can be made into a hard coat-laminated film by forming a hard coat on at least one surface of the poly(meth)acrylimide film.

According to at least one embodiment, when the anchor coat or the hard coat is formed, it is preferable that the lamination surface of the poly(meth)acrylimide film be subjected to a corona discharge treatment thereby making the wetting index (which is measured according to JIS K6768:1999) 50 mN/m or higher. Although the anchor coat or the hard coat may be formed without any treatment, carrying out the corona discharge treatment enables a good interlayer adhesive strength to be provided without depending on the kind of a coating material for forming the anchor coat or the hard coat. The wetting index is preferably 60 mN/m or higher. A method of the corona discharge treatment is not especially limited, but there can be used, for example, a method described later for the third embodiment.

According to at least one embodiment, an anchor coat agent for forming the anchor coat is not especially limited as long as having a high transparency and exhibiting no coloration for the purpose that an easily-adhesive film to be obtained is used as a touch panel display face plate or a transparent conductive substrate. As the anchor coat agent, there can be used, for example, a known one such as polyester, acryl, polyurethane, acrylurethane or polyesterurethane. Among these, a thermoplastic urethane anchor coat agent is preferable from the viewpoint of improving the adhesive strength with the hard coat.

A commercially available example of the thermoplastic urethane anchor coat agent includes "Washin Coat (trade name)" of Washin Chemical Industry Co., Ltd.

According to at least one embodiment, further as the anchor coat agent, there may be used a coating material containing a silane coupling agent. Suitable examples of the silane coupling agent include silane compounds having at least two different reactive groups of a hydrolyzable group (for example, an alkoxy group such as a methoxy group or an ethoxy group, an acyloxy group such as an acetoxy group, and a halogen group such as a chloro group), and an organic functional group (for example, an amino group, a vinyl group, an epoxy group, a methacryloxy group, an acryloxy group and an isocyanate group). The silane coupling agent functions to improve the adhesive strength with the hard coat. Among these, from the viewpoint of improving the adhesive strength with the hard coat, silane coupling agents having an amino group are preferable.

According to at least one embodiment, a coating material containing the silane coupling agent may be one containing the silane coupling agent as the main component (50 mass % or more in terms of the solid content). Preferably, 75 mass % or more of the solid content of the coating material is the silane coupling agent. A more preferable proportion is 90 mass % or more.

Examples of the silane coupling agent containing an amino group include N-2-(aminoethyl)-3-aminopropylmethyldimethoxysilane, N-2-(aminoethyl)-3-aminopropyltrimethoxysilane, N-2-(aminoethyl)-3-aminopropyltriethoxysilane, 3-aminopropyltrimethoxysilane, 3-aminopropyltriethoxysilane, 3-triethoxysilyl-N-(1,3-dimethyl-butylidene)propylamine, N-phenyl-3-aminopropyltrimethoxysilane, and N-(vinylbenzyl)-2-aminoethyl-3-aminopropyltrimethoxysilane.

Examples of the silane coupling agent having an amino group include commercially available products of Shin-Etsu Chemical Co., Ltd., Dow Corning Toray Co., Ltd., Tokyo Chemical Industry Co., Ltd. and the like.

Further the anchor coat agent may contain, within the limits of not being contrary to the purpose of the invention, one or two or more additives such as antioxidants, weather-resistance stabilizers, light-resistance stabilizers, ultraviolet absorbents, thermal stabilizers, antistatic agents, surfactants, colorants, infrared blocking agents, leveling agents, thixotropy imparting agents and fillers.

According to at least one embodiment, a method for applying the anchor coat agent is not especially limited, and there can be used, for example, a method described later for the third embodiment. The dry thickness of the anchor coat is usually 0.01 to 5 μm, and preferably 0.1 to 2 μm.

According to at least one embodiment, the coating material for forming the hard coat is not especially limited as long as having a high transparency and exhibiting no coloration for the purpose that a hard coat-laminated film to be obtained is used as a touch panel display face plate or a transparent conductive substrate, and any coating material can be used.

Preferable coating materials for forming the hard coat include ones capable of forming hard coats excellent further in surface hardness and scratch resistance as well. Specifically, the coating materials include active energy-ray curable resin compositions described below.

According to at least one embodiment, the active energy-ray curable resin compositions herein are resin compositions which can be polymerized and cured by active energy rays such as ultraviolet rays and electron beams thereby forming hard coats. Examples of the active energy-ray curable resin compositions include compositions containing an active energy-ray curable resin together with a compound having two or more isocyanate groups (—N=C=O) in one molecule thereof and/or a photopolymerization initiator.

Examples of the active energy-ray curable resin compositions include one or more selected from (meth)acryloyl group-containing prepolymers or oligomers such as polyurethane(meth)acrylate, polyester(meth)acrylate, polyacryl (meth)acrylate, polyepoxy(meth)acrylate, polyalkylene glycol poly(meth)acrylate and polyether(meth)acrylate; (meth) acryloyl group-containing monofunctional reactive monomers such as methyl(meth)acrylate, ethyl(meth)acrylate, n-butyl(meth)acrylate, hexyl(meth)acrylate, 2-ethylhexyl(meth)acrylate, lauryl(meth)acrylate, isobornyl(meth)acrylate, dicyclopentenyl(meth)acrylate, dicyclopentenyloxyethyl(meth)acrylate, phenyl(meth)acrylate, phenyl cellosolve(meth)acrylate, 2-methoxyethyl (meth)acrylate, hydroxyethyl(meth)acrylate, hydroxypropyl (meth)acrylate, 2-acryloyloxyethyl hydrogen phthalate, dimethylaminoethyl(meth)acrylate, trifluoroethyl(meth)acrylate and trimethylcyloxyethyl methacrylate; monofunctional reactive monomers such as N-vinylpyrrolidone and styrene; (meth)acryloyl group-containing bifunctional reactive monomers such as diethylene glycol di(meth)acrylate, neopentyl glycol di(meth)acrylate, 1,6-hexanediol di(meth) acrylate, polyethylene glycol di(meth)acrylate, 2,2'-bis(4-(meth)acryloyloxypolyethyleneoxyphenyl)propane and 2,2'-bis(4-(meth)acryloyloxypolypropyleneoxyphenyl)propane; (meth)acryloyl group-containing trifunctional reactive monomers such as trimethylolpropane tri(meth)acrylate and trimethylolethane tri(meth)acrylate; (meth)acryloyl group-containing tetrafunctional reactive monomers such as pentaerythritol tetra(meth)acrylate; and (meth)acryloyl group-containing hexafunctional reactive monomers such as dipentaerythritol hexaacrylate. Other examples thereof include resins containing one or more of these active energy-ray curable resins as their constituting monomers. The active energy-ray curable resins can be used singly or as a mixture of two or more.

(Meth)acrylate herein refers to acrylate or methacrylate.

Examples of the compounds having two or more isocyanate groups in one molecule thereof include methylenebis-4-cyclohexyl isocyanate; polyisocyanates such as trimethylolpropane adducts of tolylene diisocyanate, trimethylolpropane adducts of hexamethylene diisocyanate, trimethylolpropane adducts of isophorone diisocyanate, isocyanurates of tolylene diisocyanate, isocyanurates of hexamethylene diisocyanate, isocyanurates of isophorone diisocyanate, and biurets of hexamethylene diisocyanates; and urethane crosslinking agents such as blocked isocyanates of the above polyisocyanates. These may be used singly or in a combination of two or more. Further in crosslinking, there may be added, as required, a catalyst such as dibutyltin dilaurate or dibutyltin diethylhexanoate.

Examples of the photopolymerization initiator include benzophenone compounds such as benzophenone, methyl o-benzoyl benzoate, 4-methylbenzophenone, 4,4'-bis(diethylamino)benzophenone, methyl o-benzoylbenzoate, 4-phenylbenzophenone, 4-benzoyl-4'-methyldiphenyl sulfide, 3,3',4,4'-tetra(tert-butylperoxycarbonyl)benzophenone and 2,4,6-trimethylbenzophenone; benzoin compounds such as benzoin, benzoin methyl ether, benzoin ethyl ether, benzoin isopropyl ether and benzyl methyl ketal; acetophenone compounds such as acetophenone, 2,2-dimethoxy-2-phenylacetophenone and 1-hydroxycyclohexyl phenyl ketone; anthraquinone compounds such as methylanthraquinone, 2-ethylanthraquinone and 2-amylanthraquinone; thioxanthone compounds such as thioxanthone, 2,4-diethylthioxanthone and 2,4-diisopropylthioxanthone; alkylpheneone compounds such as acetophenone dimethyl ketal; triazine compounds; biimidazole compounds; acylphosphine oxide compounds; titanocene compounds; oxime ester compounds; oxime phenylacetic acid ester compounds; hydroxyketone compounds; and aminobenzoate compounds. These may be used singly or in a combination of two or more.

Further the active energy-ray curable resin composition may contain, as required, one or two or more additives such as antistatic agents, surfactants, leveling agents, thixotropy imparting agents, antifouling agents, printability improvers, antioxidants, weather-resistance stabilizers, light-resistance stabilizers, ultraviolet absorbents, thermal stabilizers, colorants and fillers.

Among optional components contained in the active energy-ray curable resin composition if needed, preferable ones include microparticles having an average particle diameter of 1 nm to 300 nm. By using the microparticle in 1 to 300 parts by mass, preferably 20 to 100 parts by mass, with respect to 100 parts by mass of the active energy-ray curable resin components, the hardness of the hard coat can be raised.

As the microparticle, either of inorganic microparticles and organic microparticles can be used. Examples of the inorganic microparticles include silica (silicon dioxide); metal oxide microparticles such as aluminum oxide, zirconia, titania, zinc oxide, germanium oxide, indium oxide, tin oxide, indium tin oxide, antimony oxide and cerium oxide; metal fluoride microparticles such as magnesium fluoride and sodium fluoride; metal microparticles; metal sulfide microparticles; and metal nitride microparticles. Examples of the organic microparticles include resin beads of styrenic resins, acrylic resins, polycarbonate resins, ethylenic resins, and cured resins of amino compounds with formaldehyde. These may be used singly or in a combination of two or more.

Further for the purpose of enhancing the dispersibility of the microparticles in the coating material and raising the hardness of the hard coat layer to be obtained, there may be used the microparticles whose surfaces are treated with silane coupling agents such as vinylsilane and aminosilane; titanate coupling agents; aluminate coupling agents; organic compounds having a reactive functional group such as an ethylenic unsaturated bond group such as a (meth)acryloyl group, a vinyl group or an allyl group, or an epoxy group; and surface treating agents such as fatty acids and fatty acid metal salts.

Among these microparticles, in order to obtain hard coat layers having a higher hardness, microparticles of silica or aluminum oxide are preferable; and microparticles of silica are more preferable. Commercially available products of silica microparticles include Snowtex (trade name) of Nissan Chemical Industries, Ltd., and Quatron (trade name) of Fuso Chemical Co., Ltd.

According to at least one embodiment, the average particle diameter of the microparticles is, in order to maintain the transparency of the hard coat layer and sufficiently attaining the hardness improving effect, preferably 300 nm or smaller. The average particle diameter of the microparticles is preferably 200 nm or smaller, and more preferably 120 nm or smaller. On the other hand, there is especially no lower limit of the average particle diameter of the microparticles, but the average particle diameter of usually available particles is about 1 nm at the finest.

According to at least one embodiment, the average particle diameter of the microparticles herein is a particle diameter at which the microparticle cumulation from the small particle diameter side becomes 50 mass % in a particle size distribution curve measured using a laser diffraction scattering particle size analyzer "MT3200II" (trade name) of Nikkiso Co., Ltd.

Further the active energy-ray curable resin composition may contain a solvent, as required, in order to dilute with the solvent into an easily coatable concentration. The solvent is not especially limited, as long as the solvent does not react with components of the curable resin composition or optional other components and the solvent does not catalyze (or accelerate) self-reactions (including deteriorative reactions) of these components. Examples of the solvent include 1-methoxy-2-propanol, ethyl acetate, n-butyl acetate, toluene, methyl ethyl ketone, methyl isobutyl ketone, diacetone alcohol, and acetone.

The active energy-ray curable resin composition can be obtained by mixing and stirring these components.

A method for applying a coating material such as the active energy-ray curable resin composition is not especially limited, and there can be used, for example, a method described later for the third embodiment.

According to at least one embodiment, the thickness of the hard coat is, from the viewpoint of surface hardness, preferably 17 μm or larger, more preferably 20 μm or larger, and still more preferably 25 μm or larger. By contrast, the thickness of the hard coat is, from the viewpoint of web handleability, preferably 100 μm or smaller, and more preferably 50 μm or smaller.

According to at least one embodiment, the poly(meth)acrylimide film, the easily-adhesive film and the hard coat-laminated film according to the first embodiment of the invention are suitably used as members of image display apparatuses (including image display apparatuses having a touch panel function, and image display apparatuses having no touch panel function).

2. A Method for Producing the Poly(Meth)Acrylimide Film

The second embodiment of the invention will be described.

The second embodiment of the invention is a method for producing the poly(meth)acrylimide film, and the method includes the steps of (A) continuously extruding, with an apparatus equipped with an extruder and a T die, a molten film of a poly(meth)acrylimide from the T die.

According to at least one embodiment, the properties of the poly(meth)acrylimide as a raw material to be used in the production method and the poly(meth)acrylimide film as a product are not especially limited, but may be preferably those described above for the first embodiment.

As the extruder, any can be used, and examples thereof include a single-screw extruder, a co-rotation twin-screw extruder and a counter-rotation twin-screw extruder.

Further in order to suppress the degradation of the poly(meth)acrylimide during film production, it is preferable that the interior of the extruder be purged with nitrogen.

Further since the poly(meth)acrylimide is a resin having a high hygroscopicity, it is preferable that the poly(meth)acrylimide be dried before being fed to film production. It is also preferable that the poly(meth)acrylimide dried in a drier be conveyed directly to and charged in an extruder. The set temperature of the drier is preferably 100 to 150° C.

According to at least one embodiment, the T die is not especially limited, and any one may be used. Examples thereof include a manifold die, a fish tail die, and a coat hanger die.

In order to stably carry out the continuous extrusion step of the molten film of the poly(meth)acrylimide, it is preferable that the temperature of the T die is set at lowest at 260° C. or higher. The temperature of the T die is more preferably 270° C. or higher. In order to suppress the deterioration of the poly(meth)acrylimide, it is also preferable that the temperature of the T die is set at 350° C. or lower.

Further it is preferable that the ratio (R/T) of the lip opening (R) to the thickness (T) of the poly(meth)acrylimide film to be obtained be 1 to 5. From the viewpoint of preventing the increase in the retardation, the ratio (R/T) is preferably 5 or lower. By contrast, from the viewpoint of suppressing the extrusion load, the ratio (R/T) is preferably 1 or higher. The ratio (R/T) is more preferably 1.1 to 2.5.

According to at least one embodiment, the method for producing the poly(meth)acrylimide film according to the second embodiment of the invention comprises (B) the step of feeding and pressing the molten film of the poly(meth)acrylimide between a first rotating or circulating mirror-finished body and a second rotating or circulating mirror-finished body.

Examples of the first mirror-finished body include a mirror-finished roll and a mirror-finished belt. Examples of the second mirror-finished body include a mirror-finished roll and a mirror-finished belt.

According to at least one embodiment, the mirror-finished roll is a roll whose surface has been subjected to a mirror surface processing, and includes a metal-made one, a ceramic-made one, and a silicon rubber-made one. Further with respect to the surface of the mirror-finished roll, for the purpose of protection from corrosion and scratching, the surface can be subjected to a chromium plating, an iron-phosphorus alloy plating, or a hard carbon treatment by a PVD method or a CVD method.

According to at least one embodiment, the "mirror surface processing" here is not especially limited, and a surface may be processed into a mirror surface state by a known means such as polishing using fine abrasive grains. For example, the first and/or second mirror-finished body(-ies) may preferably have an arithmetic average roughness (Ra) of 100 nm or smaller, and more preferably 50 nm or smaller. Further for example, the first and/or second mirror-finished body(-ies) may preferably have a ten-point average roughness (Rz) of 500 nm or smaller, and more preferably 200 nm or smaller.

According to at least one embodiment, the mirror-finished belt is usually a metal-made seamless belt, whose surface has been subjected to a mirror surface processing, and is made to be stretched and circulated between a pair of rollers. Further, for the purpose of protection from corrosion and scratching, the surface of the mirror-finished belt can be subjected to a chromium plating, an iron-phosphorus alloy plating, or a hard carbon treatment by a PVD method or a CVD method.

While not wanting to be bound by any specific theory, the reason that the poly(meth)acrylimide film excellent in surface smoothness, transparency and appearance can be obtained by the production method according to various embodiments of the invention is believed as follows: by pressing the molten film of the poly(meth)acrylimide between the first mirror-finished body whose surface temperature is made at 100 to 200° C. and the second mirror-finished body whose surface temperature is made at 20 to 200° C., the highly smooth surface state of the first mirror-finished body and the second mirror-finished body is transferred to the film to correct faulty portions such as die streaks.

In order for the transfer of the surface state to be well carried out, the surface temperature of the first mirror-finished body may be at lowest at 100° C. or higher, preferably 120° C. or higher, and more preferably 140° C. or higher. By contrast, in order to prevent the development on the film of appearance faults (exfoliation marks) accompanying the peeling-off from the first mirror-finished body, the surface temperature of the first mirror-finished body is 200° C. or lower, and preferably 160° C. or lower.

In order for the transfer of the surface state to be well carried out, the surface temperature of the second mirror-finished body may be at lowest at 20° C. or higher, preferably 60° C. or higher, and more preferably 100° C. or higher. By contrast, in order to prevent the development on the film of appearance faults (exfoliation marks) accompanying the peeling-off from the second mirror-finished body, the surface temperature of the second mirror-finished body is 200° C. or lower, and preferably 160° C. or lower.

It is preferable that the surface temperature of the first mirror-finished body be made higher than the surface temperature of the second mirror-finished body. This is to make the film to be held on the first mirror-finished body and to be delivered to a following transfer roll.

By referring to FIG. 1, one example of the second embodiment of the invention will be described. The FIGURE is a conceptual view illustrating one example of a production method according to the second embodiment of the invention.

An apparatus illustrated in the FIGURE contains a T die 1, a molten film 2, a mirror-finished roll 3, a mirror-finished belt 4, and a pair of belt rollers 5. The mirror-finished belt 4 is configured to be stretched and circulated between the pair of belt rollers 5.

According to at least one embodiment, the molten film 2 of a poly(meth)acrylimide continuously extruded from the T die 1 is fed and pressed between the rotating mirror-finished roll 3 and the mirror-finished belt 4 circulating along the outer peripheral surface of the mirror-finished roll 3; as a result, a highly smooth surface state of each of the mirror-finished roll 3 and the mirror-finished belt 4 is transferred to the film thereby forming a film corrected for faulty portions such as die streaks, and excellent in surface smoothness, transparency and appearance.

According to at least one embodiment, the mirror-finished belt 4, on being pressed on the mirror-finished roll 3, comes to be circulated along the outer peripheral surface of the mirror-finished roll 3. Therefore, the use of the mirror-finished roll 3 and the mirror-finished belt 4 enables the pressing of the molten film to be carried out on their surfaces, whereby the transfer of the above surface state and the correction of the above faulty portions can securely be carried out.

According to at least one embodiment, the above pair of belt rollers 5 is, in order to highly hold the parallelism of the mirror-finished roll 3 with the mirror-finished belt 4, usually suspended on a support stand capable of finely regulating the space therebetween vertically and backward and forward. Further with the space between the pair of belt rollers 5, the tension of the mirror-finished belt 4 can be controlled.

According to at least one embodiment, the thickness of the poly(meth)acrylimide film to be produced by the production method according to the second embodiment of the invention is not especially limited, but is preferably as described in the above first embodiment.

3. A Method for Producing the Easily-Adhesive Poly(Meth)Acrylimide Film

Then, the third embodiment of the invention will be described.

According to at least one embodiment, the third embodiment of the invention is a method for producing the easily-adhesive poly(meth)acrylimide film, and the method comprises (1) the step of subjecting at least one surface of the poly(meth)acrylimide film to a corona discharge treatment.

According to at least one embodiment, the corona discharge treatment involves passing the film between an insulated electrode and a dielectric roll, and applying a high-frequency high-voltage therebetween to generate a corona discharge thereby treating the film surface. The corona discharge ionizes oxygen and the like; and the ions collide against the film surface to cause the scission of resin molecule chains and the addition of oxygen-containing functional groups to resin molecule chains on the film surface, by which the adhesive strength with the hard coat can be improved.

Whether or not the amount of the treatment (S) per unit area and unit time of the corona discharge treatment is sufficient to improve the adhesive strength with the hard coat can be judged by using the wetting index (which is measured according to JIS K6788:1999). The wetting index meeting expectation of a sufficient adhesive strength is usually 50 mN/m or higher, and preferably 60 mN/m or higher. The amount of the treatment (S) needed to obtain the expected wetting index is usually 80 W·min/m$^2$ or more, and preferably 120 W·min/m$^2$ or more.

Further from the viewpoint of preventing the deterioration of the film, the amount of the treatment (S) of the corona discharge treatment is preferably kept as low as 500 W·min/m$^2$ or less. The amount of the treatment (S) is more preferably 400 W·min/m$^2$ or less.

Here, the amount of the treatment (S) is defined by the following expression.

$$S=P/(L\cdot V)$$

wherein,
S: an amount of treatment (W·min/m$^2$);
P: a discharge power (W);
L: a length of the discharge electrode (m); and
V: a line velocity (m/min).

The production method according to the third embodiment of the invention comprises (2) the step of forming, as an easily-adhesive surface, an anchor coat containing a silane coupling agent having an amino group on the treated surface of the poly(meth)acrylimide film having been subjected to the corona discharge treatment in the step (1).

According to at least one embodiment, the silane coupling agent having an amino group is a silane compound having at least two different reactive groups of a hydrolyzable group (for example, an alkoxy group such as a methoxy group or an ethoxy group; an acyloxy group such as an acetoxy group; and a halogen group such as a chloro group) and an amino group. The silane coupling agent having an amino group functions to improve the adhesive strength with the hard coat.

The silane coupling agent having an amino group is not especially limited, but ones exemplified for the above first embodiment can be used.

A coating material for forming the anchor coat containing the silane coupling agent having an amino group is preferably a coating material containing, as the main component (50 mass % or more in terms of the solid content), the silane coupling agent having an amino group. It is more preferable that 75 mass % or more of the solid content of the coating material be the silane coupling agent having an amino group. It is still more preferable that 90 mass % or more of the solid content of the coating material be the silane coupling agent having an amino group.

The coating material for forming the anchor coat containing the silane coupling agent having an amino group may contain a silane coupling agent having no amino group, for example, a vinyl silane coupling agent, an epoxy silane coupling agent, a methacryloxy silane coupling agent, an acryloxy silane coupling agent, a mercapto silane coupling agent, an isocyanate silane coupling agent or a ureido silane coupling agent. From the viewpoint of improving the adhesive strength with the hard coat, it is preferable that the proportion of the silane coupling agent having no amino group in the coating material be lower; and the proportion may be usually 50 mass % or less of the solid content, and more preferably less than 25 mass % of the solid content.

According to at least one embodiment, the coating material may contain, within the limits of not being contrary to the purpose of the invention, one or two or more additives such as adhesive resins, antioxidants, weather-resistance stabilizers, light-resistance stabilizers, ultraviolet absorbents, thermal stabilizers, antistatic agents, surfactants, colorants, infrared blocking agents, leveling agents, thixotropy imparting agents and fillers.

A method for applying the coating material is not especially limited, and a known web applying method can be used. The method specifically includes methods of roll coating, gravure coating, reverse coating, roll brushing, spray coating, air knife coating and die coating. At this time, as required, there can be used an optional diluting solvent, for example, methanol, ethanol, isopropyl alcohol, 1-methoxy-2-propanol, n-butyl acetate, toluene, methyl ethyl ketone, methyl isobutyl ketone, ethyl acetate or acetone.

According to at least one embodiment, the coating material can be obtained by mixing and stirring the silane coupling agent having an amino group, and other components.

A method for drying a wet applied film of the coating material is not especially limited, and a known method can be used.

The dry thickness of the anchor coat containing the silane coupling agent having an amino group is usually about 0.01 to 5 μm, and preferably 0.1 to 2 μm.

The poly(meth)acrylimide film to be used in the production method according to the third embodiment of the invention is not especially limited as long as having a high transparency and exhibiting no coloration for the purpose of being used as a transparent resin film base material, and there can be used a film formed from any poly(meth)acrylimide by any method.

The poly(meth)acrylimide film may be preferably one described for the above first embodiment. Further the poly(meth)acrylimide film may be preferably one produced by the method described for the above second embodiment.

The thickness of the poly(meth)acrylimide film to be used in the production method according to the third embodiment of the invention is not especially limited, and can be any thickness, as desired. The thickness of the poly(meth)acrylimide film may be, from the viewpoint of web handleability, usually 20 μm or larger, and preferably 50 μm or larger. Further from the viewpoint of economic efficiency, the thickness may be usually 250 μm or smaller, and preferably 150 µm or smaller. By contrast, in the case where the easily-adhesive poly(meth)acrylimide film obtained by the production method according to the third embodiment of the invention is used as a display face plate, the thickness may be, from the viewpoint of maintaining the rigidity, usually 100 µm or larger, preferably 200 µm or larger, and still more preferably 300 µm or larger. Further from the viewpoint of meeting the requirement of the thickness reduction of touch panels, the thickness may be usually 1,500 µm or smaller, preferably 1,200 µm or smaller, and still more preferably 1,000 µm or smaller.

On the easily-adhesive surface of the easily-adhesive poly(meth)acrylimide film obtained by the production method according to the third embodiment of the invention, a hard coat can be laminated. A coating material for forming the hard coat is not especially limited as long as being excellent in transparency and exhibiting no coloration for the purpose of being used as a base material of touch panel display face plates and transparent conductive substrates, and any coating material can be used.

Preferable examples of the coating material for forming the hard coat in accordance with various embodiments include ones capable for forming the hard coat excellent further in surface hardness and scratch resistance as well. The coating material specifically includes the active energy-ray curable resin compositions described for the above first embodiment.

In the production method according to the third embodiment of the invention, among optional components to be used in the active energy-ray curable resin compositions according to needs, preferable ones include hydroxyl group-containing silicone-modified acrylic surface regulators. In the case where the hard coat-laminated film is used as a touch panel display face plate, the incorporation of the hydroxyl group-containing silicon-modified acrylic surface regulator in the touch surface-side hard coat can make the finger slidability good.

A method of applying the coating material for forming the hard coat such as the active energy-ray curable resin composition is not especially limited, and a known web applying method can be used. The method specifically includes methods of roll coating, gravure coating, reverse coating, roll brushing, spray coating, air knife coating and die coating.

The thickness of the hard coat is not especially limited, but is preferably the thickness described for the above first embodiment.

EXAMPLES

Hereinafter, embodiments of the invention will be described in more detail by way of Examples. These Examples are no more than exemplifications to suitably illustrate the various embodiments, and do not limit the various embodiments of the invention at all.

Measurement and Evaluation Methods of Physical Properties

Measurement and evaluation methods of the physical properties were as follows.

Total Light Transmittance

The total light transmittance was measured according to JIS K7361-1:1997 by using a turbidimeter "NDH2000" (trade name) of Nippon Denshoku Industries Co., Ltd.

Haze

The haze was measured according to JIS K7136:2000 by using a turbidimeter "NDH2000" (trade name) of Nippon Denshoku Industries Co., Ltd.

Retardation

The retardation was measured by using a phase difference analyzer "KOBRA-WR"(trade name) using a parallel Nicol rotation method of Oji Scientific Instruments Co., Ltd.

Surface Appearance

While a film surface (in the case of the easily-adhesive film, the easily-adhesive surface) was irradiated with light of a fluorescent lamp by changing the incident angle in various directions, the film surface was visually observed, and evaluated according to the following criteria.

⊚: The surface exhibited no undulations nor flaws, and even when being held up nearby to the light, no impression of cloudiness.

○: When being looked closely into, the surface had a few recognized undulations and flaws. When being held up nearby to the light, a slight impression of cloudiness was exhibited.

Δ: The surface had recognized undulations and flaws, and gave an impression of cloudiness.

X: The surface had a large number of recognized undulations and flaws, and also gave a definite impression of cloudiness.

Color Tone

The yellowness index (YI) was measured according to JIS K7105:1981 by using a chromaticity meter "SolidSpec-3700 (trade name)" manufactured by Shimadzu Corp.

Pencil Hardness

The pencil hardness was evaluated according to JIS K5600-5-4 by using a pencil "UNI" (trade name) of Mitsubishi Pencil Co., Ltd under the condition of a load of 200 g or 750 g. For the hard coat-laminated poly(meth)acrylimide film, the hard coat surface was evaluated.

Linear Expansion Coefficient (Thermal Dimensional Stability)

The linear expansion coefficient was measured according to JIS K7197:1991. A thermomechanical analyzer (TMA) "EXSTAR6000 (trade name)" of Seiko Instruments Inc. was used. The test piece had a size of 20 mm in length and 10 mm in width, and was sampled so that the machine direction (MD) of the film became the longitudinal direction of the test piece. The condition regulation of the test piece was carried out at a temperature of 23° C.±2° C. and a relative humidity of 50±5% for 24 hours; and for the purpose of measuring the dimensional stability as a value of a physical property of the film, the condition regulation at the highest temperature in the measurement was not carried out. The interchuck distance was made to be 10 mm; and the temperature program was made to be such that the test piece was held at a temperature of 20° C. for 3 min, and thereafter heated at a temperature-rise rate of 5° C./min up to 270° C. The linear expansion coefficient was calculated from a temperature-test piece length curve acquired under the condition that for the poly(meth)acrylimide film, the low temperature-side temperature was set at 30° C. and the high temperature-side temperature was set at 200° C.; and for the hard coat-laminated poly(meth)acrylimide film, the low temperature-side temperature was set at 30° C. and the high temperature-side temperature was set at 250° C.

Cross-Cut Test (Adhesiveness with the Hard Coat)

Cross cuts were scored so as to make 100 squares (1 square: 1 mm×1 mm) on the hard coat-laminated film from the hard coat side thereof according to JIS K5600-5-6:1990; thereafter, a tape for adherence test was pasted on the cross cuts, and squeezed across by finger, and then peeled off. The evaluation criteria were according to table 1 in the above JIS. Herein, however, class 0 is represented as ⊚; class 1, as ○; class 2, as Δ; class 3, as X; class 4, as X X; and class 5, as X X X.

Finger Slidability

The finger slidability was evaluated according to impressions of whether or not the hard coat surface of the hard coat-laminated film could be desiredly rubbed when being rubbed up and down and right and left or circularly by a forefinger. The test was carried out by 10 test members each, and the case where the test sample could be desiredly rubbed was determined to have scored 2 points; the case where the test sample could be almost desiredly rubbed, 1 points; and the case where the test sample could not be desiredly rubbed including that the finger was caught or otherwise, 0 point, and points of all the test members were totalized and the evaluation was carried out according to the following criteria.

⊚: 16 to 20 points
Δ: 10 to 15 points
X: 0 to 9 points

Stain Resistance (Oil-Based Marker)

The hard coat surface of the hard coat-laminated film was spottedly stained with a red oil-based marker; thereafter, the stained portion was covered with a watch glass and left at room temperature for 24 hours. Then, the stained portion was wiped and cleaned by using Kimwipe (trade name) sufficiently impregnated with isopropyl alcohol until no stain came to be newly attached on the Kimwipe; thereafter, the portion was visually observed and the evaluation was carried out according to the following criteria.

⊚: There was no stain.
○: There was slight stain remaining.
Δ: There was considerable stain remaining.
X: There was stain remaining significantly.

Water Contact Angle

The water contact angle of the hard coat surface of the hard coat-laminated film was measured at 25° C. and 1 atm by using a contact angle tester "CA-V (trade name)" of Kyowa Interface Science Co., Ltd.

Abrasion Resistance

A sample of 200 mm in length×25 mm in width was sampled so that the longitudinal direction of the film became the machine direction thereof, and was placed on a Gakushin (Japan Society for Promotion of Science)-type tester according to JIS L0849 so that the hard coat directed to surface. Then, a #0000 steel wool was attached to a friction pin of the Gakushin tester; a load of 500 g was mounted; and the surface of the test piece was rubbed 100 times reciprocatingly. The surface was visually observed and the evaluation was carried out according to the following criteria.

⊚: There was no scratches.
○: There was 1 to 5 scratches.
Δ: There was 6 to 10 scratches.
X: There was 11 or more scratches.

Printability

The name of the first-listed inventor was entered on the hard coat surface of the hard coat-laminated film by using the superfine side of an oil-based marker "My Name Twin (trade name)" of Sakura Color Products Corp., and the evaluation was carried out according to the following criteria.

⊚: Clean characters without any blur and cissing could be written.
○: Slight blur and cissing were recognized on written characters.
X: Written characters had unclear portions due to blur and cissing.

Raw materials used were as follows.

Raw Materials Used

Raw materials used in the following Examples, Comparative Examples and Reference Examples were as follows.

A Poly(Meth)Acrylamide (A-1) A Poly(Meth)Acrylimide "ACRYMID TT70 (Trade Name)" of Evonik (B) Anchor Coat Agents (B-1): 1 part by mass of N-2-(aminoethyl)-3-aminopropyltriethoxysilane (a silane coupling agent having amino groups) "Shin-Etsu Silicone KBE-603 (trade name)" of Shin-Etsu Chemical Co., Ltd., and 100 parts by mass of a modified alcohol solvent "a mixed solvent of ethanol/isopropyl alcohol/methanol=80/20/1 (volume ratio)" were mixed and stirred thereby obtaining an anchor coat agent (B-1).

(B-2): 90 parts by mass of a thermoplastic urethane anchor coat agent "Washin Coat VH KE-21 Clear (trade name)" of Washin Chemical Industry Co., Ltd., 10 parts by mass of a thermoplastic urethane anchor coat agent "Washin Coat VHKE-21B Matte (trade name)" of Washin Chemical Industry Co., Ltd., and 100 parts by mass of propylene glycol monomethyl ether were mixed and stirred thereby obtaining an anchor coat agent (B-2).

(B-3): 1 part by mass of 3-glycidoxypropyltrimethoxysilane "Shin-Etsu Silicone KBE-403 (trade name)" of Shin-Etsu Chemical Co., Ltd., and 100 parts by mass of a modified alcohol solvent "a mixed solvent of ethanol/isopropyl alcohol/methanol=80/20/1 (volume ratio)" were mixed and stirred thereby obtaining an anchor coat agent (B-3).

(b) Silane Coupling Agents Having No Amino Group (b-1): a vinyl silane coupling agent "Shin-Etsu Silicone KBE-1003 (trade name)" of Shin-Etsu Chemical Co., Ltd., vinyltriethoxysilane (b-2): an epoxy silane coupling agent "Shin-Etsu Silicone KBE-403 (trade name)" of Shin-Etsu Chemical Co., Ltd., 3-glycidoxypropyltriethoxysilane (b-3): a methacryloxy silane coupling agent "Shin-Etsu Silicone KBE-503 (trade name)" of Shin-Etsu Chemical Co., Ltd., 3-methacryloxypropyltriethoxysilane (b-4): a mercapto silane coupling agent "Shin-Etsu Silicone KBM-803 (trade name)" of Shin-Etsu Chemical Co., Ltd., 3-mercaptopropyltrimethoxysilane (b-5): an isocyanate silane coupling agent "Shin-Etsu Silicone KBE-9007 (trade name)" of Shin-Etsu Chemical Co., Ltd., 3-isocyanatopropyltriethoxysilane (b-6): a ureido silane coupling agent "Shin-Etsu Silicone KBM-585 (trade name)" of Shin-Etsu Chemical Co., Ltd., 3-ureidopropyltriethoxysilane (C) Coating Materials for Forming Hard Coats (C-1): 30 parts by mass of the following (c1), 70 parts by mass of the following (c2), 4 parts by mass of the following (c4) and 30 parts by mass of methyl ethyl ketone were mixed and stirred thereby obtaining a coating material (C-1) for forming a hard coat.

(C-2): 65 parts by mass of the following (c1), 65 parts by mass of the following (c3), 6.5 parts by mass of the following (c4), 5.9 parts by mass of the following (c5), and 25 parts by mass of methyl ethyl ketone and 10 parts by mass of methyl isobutyl ketone were mixed and stirred thereby obtaining a coating material (C-2) for forming a hard coat.

(C-3): 65 parts by mass of the following (c1), 65 parts by mass of the following (c3), 6.5 parts by mass of the following (c4) and 0.55 parts by mass of the following (c6), and 25 parts by mass of methyl ethyl ketone and 10 parts by mass of methyl isobutyl ketone were mixed and stirred thereby obtaining a coating material (C-3) for forming a hard coat.

(C-4): 65 parts by mass of the following (c1), 65 parts by mass of the following (c3), 6.5 parts by mass of the following (c4) and 0.55 parts by mass of the following (c7), and 25 parts by mass of methyl ethyl ketone and 10 parts by mass of methyl isobutyl ketone were mixed and stirred thereby obtaining a coating material (C-4) for forming a hard coat.

(C-5): 65 parts by mass of the following (c1), 65 parts by mass of the following (c3), 6.5 parts by mass of the following (c4) and 0.55 parts by mass of the following (c8), and 25 parts by mass of methyl ethyl ketone and 10 parts by mass of methyl isobutyl ketone were mixed and stirred thereby obtaining a coating material (C-5) for forming a hard coat.

(c1): dipentaerythritol hexaacrylate of Nippon Kayaku Co., Ltd.

(c2): a mixed coating material "LaromerPO9026 (trade name)" of a polyether acrylate with a nano silica (average particle diameter: 20 nm) in 50:50 (mass ratio) of BASF (c3): a mixed coating material "NANOBYK-3605 (trade name)" of hexanediol diacrylate with a surface-treated nano silica (average particle diameter: 20 nm) in 50:50 (mass ratio) of Big Chemy Japan KK (c4): a phenyl ketone photopolymerization initiator (1-hydroxycyclohexyl phenyl ketone) "SB-PI714 (trade name)" of Shuang-Bang Ind. Corp.

(c5): a hydroxyl group-containing silicon-modified acrylic surface regulator "BYK-SILCLEAN3700 (trade name)" of Big Chemy Japan KK (c6): an acrylic surface regulator "BYK-352 (trade name)" of Big Chemy Japan KK (c7): an acrylic surface regulator "BYK-358N (trade name)" of Big Chemy Japan KK (c8): A modified silicon surface regulator "Polyflow KL-403 (trade name)" of Kyoueisha Chemical Co., Ltd.

Example 1

A film having a thickness of 250 μm was formed by using the (A-1) poly(meth)acrylimide, and using a 50-mm extruder (installed with a W flight screw having an L/D of 29 and a CR of 1.86), a T die having a die width of 680 mm and an apparatus equipped with a mirror-finished roll and a mirror-finished belt, under such conditions that set temperatures of from the extruder to the T die were C1/C2/C3/AD/D1 to D6=280/300/320/320/320 to 320° C.; the lip opening of the T die was 0.5 mm; the screw rotation frequency was 90 rpm; the surface temperature of the mirror-finished roll was 140° C.; the surface temperature of the mirror-finished belt was 120° C.; the pressure of the mirror-finished belt was 1.4 MPa; and the taking-up velocity was 5.6 m/min. For the obtained film, there were carried out the measurement tests of the total light transmittance, the haze, the retardation, the surface appearance, the color tone, the pencil hardness (750-g load) and the linear expansion coefficient (thermal dimensional stability) by the above methods. The results are shown in Table 1.

Examples 2 to 5, and Comparative Examples 1 and 2

Films were formed wholly as in Example 1, except for altering the surface temperature of the mirror-finished roll and the surface temperature of the mirror-finished belt to those shown in Table 1 or Table 2. The results of the measurements of physical properties and the evaluation are shown in Table 1 or Table 2.

Comparative Example 3

A film was formed wholly as in Example 1, except for altering the surface temperature of the mirror-finished roll to 220° C. Due to exfoliation marks accompanying the peeling-off from the mirror-finished roll, the appearance was remarkably poor. Therefore, the evaluations of physical properties other than the appearance could not be carried out (not shown in Tables).

Comparative Example 4

A film was formed wholly as in Example 1, except for altering the surface temperature of the mirror-finished belt to 220° C. Due to exfoliation marks accompanying the peeling-off from the mirror-finished belt, the appearance was remarkably poor. Therefore, the evaluations of physical properties other than the appearance could not be carried out (not shown in Tables).

Example 7

A film having a thickness of 250 μm was formed by using the (A-1) poly(meth)acrylimide, and using a 50-mm extruder (installed with a W flight screw having an L/D of 29 and a CR of 1.86), a T die having a die width of 680 mm and an apparatus equipped with a first mirror-finished roll and a second mirror-finished roll, under such conditions that set temperatures of from the extruder to the T die were C1/C2/C3/AD/D1 to D6=280/300/320/320/320 to 320° C.; the lip opening of the T die was 0.5 mm; the screw rotation frequency was 90 rpm; the surface temperature of the first mirror-finished roll was 140° C.; the surface temperature of the second mirror-finished roll was 40° C.; the pressure between the mirror-finished rolls was 1.4 MPa; and the taking-up velocity was 5.6 m/min. For the obtained film, there were carried out the measurement tests of the total light transmittance, the haze, the retardation, the surface appearance, the color tone, the pencil hardness (750-g load) and the linear expansion coefficient (thermal dimensional stability) by the above methods. The results are shown in Table 2.

Example 8

A film was formed wholly as in Example 3, except for altering the taking-up velocity to 2.6 m/min to make the film thickness to be 550 μm. The measurements of the physical properties and the evaluation results are shown in Table 2.

Example 9

A film was formed wholly as in Example 7, except for altering the taking-up velocity to 2.6 m/min to make the film thickness to be 550 μm. The measurements of the physical properties and the evaluation results are shown in Table 2.

TABLE 1

|  |  | Example 1 | Example 2 | Example 3 | Example 4 | Example 5 |
|---|---|---|---|---|---|---|
| Film Formation Conditions | First Mirror-finished Body | roll | roll | roll | roll | roll |
|  | Second Mirror-finished Body | belt | belt | belt | belt | belt |
|  | Temperature of the First Mirror-finished body ° C. | 140 | 140 | 140 | 160 | 110 |
|  | Temperature of the Second Mirror-finished body ° C. | 120 | 75 | 40 | 140 | 75 |
|  | Film Thickness μm | 250 | 250 | 250 | 250 | 250 |
| Evaluation Results | Total Light Transmittance % | 93 | 93 | 93 | 93 | 92 |
|  | Haze % | 0.6 | 0.8 | 1.1 | 0.5 | 1.2 |
|  | Retardation nm | 15 | 20 | 25 | 15 | 30 |
|  | Surface Appearance | ◎ | ◎ | ◎ | ◎ | ◎ |
|  | Yellowness Index | 0.5 | 0.5 | 0.5 | 0.5 | 0.5 |
|  | Pencil Hardness | F | F | F | F | F |
|  | Linear Expansion Coefficient ppm | 15 | 15 | 15 | 15 | 15 |

TABLE 2

|  |  | Example 7 | Example 8 | Example 9 | Comparative Example 1 | Comparative Example 2 |
|---|---|---|---|---|---|---|
| Film Formation Conditions | First Mirror-finished Body | roll | roll | roll | roll | roll |
|  | Second Mirror-finished Body | roll | belt | roll | belt | belt |
|  | Temperature of the First Mirror-finished body ° C. | 140 | 140 | 140 | 140 | 75 |
|  | Temperature of the Second Mirror-finished body ° C. | 40 | 40 | 40 | 10 | 40 |
|  | Film Thickness μm | 250 | 550 | 550 | 250 | 250 |
| Evaluation Results | Total Light Transmittance % | 92 | 92 | 91 | 90 | 88 |
|  | Haze % | 0.8 | 1.3 | 1.0 | 1.8 | 2.1 |
|  | Retardation nm | 35 | 10 | 15 | 45 | 50 |
|  | Surface Appearance | ◎ | ◎ | ◎ | ○ | Δ |
|  | Yellowness Index | 0.5 | 0.6 | 0.6 | 0.5 | 0.5 |
|  | Pencil Hardness | F | F | F | F | F |
|  | Linear Expansion Coefficient ppm | 20 | 10 | 20 | 45 | 45 |

Example 10

A corona discharge treatment was carried out on one surface of the poly(meth)acrylimide film obtained in the above Example 3, under the condition of an amount of the treatment of 167 W·min/m² (discharge power: 500 W, length of a discharge electrode: 1 m, line velocity: 3 m/min). The (B-1) anchor coat agent was then applied to the corona discharge-treated surface by using a film mayer bar-type coating device so that the dry film thickness became 0.5 μm thereby obtaining an easily-adhesive poly(meth)acrylimide film. The obtained easily-adhesive poly(meth)acrylimide film was subjected to the measurement tests of the total light transmittance, the haze, the surface appearance and the color tone by the above methods. The coating material (C-1) was then applied to the easily-adhesive surface of the easily-adhesive poly(meth)acrylimide film by using a die-type coating device so that the dry thickness became 25 μm thereby obtaining a hard coat-laminated film. The obtained hard coat-laminated film was subjected to the measurement tests of the total light transmittance, the haze, the surface appearance, the color tone, the pencil hardness (750-g load), the linear expansion coefficient (thermal dimensional stability) and the cross cut test (adhesiveness with the hard coat) by the above methods. The results are shown in Table 3.

Examples 11 to 13

The corona discharge treatment, formations of easily-adhesive poly(meth)acrylimide films and hard coat-laminated films, and the physical property measurements thereof were carried out, wholly as in Example 10, except for altering the amounts of the corona discharge treatment to values indicated in Table 3. The results are shown in Table 3.

Example 14

The corona discharge treatment, formations of an easily-adhesive poly(meth)acrylimide film and a hard coat-laminated film, and the physical property measurements thereof were carried out, wholly as in Example 10, except for using the (B-2) in place of the (B-1) as the anchor coat agent. The results are shown in Table 3.

Example 15

The corona discharge treatment, formations of an easily-adhesive poly(meth)acrylimide film and a hard coat-laminated film, and the physical property measurements thereof were carried out, wholly as in Example 10, except for using the (B-3) in place of the (B-1) as the anchor coat agent. The results are shown in Table 3.

Reference Example 1

Formations of an easily-adhesive poly(meth)acrylimide film and a hard coat-laminated film, and the physical property measurements thereof were carried out, wholly as in Example 15, except for carrying out no corona discharge treatment. The results are shown in Table 3.

TABLE 3

|  | Example 10 | Example 11 | Example 12 | Example 13 | Example 14 | Example 15 | Reference Example 1 |
|---|---|---|---|---|---|---|---|
| Amount of Corona Discharge Treatment W·min/m² | 167 | 120 | 400 | 80 | 167 | 400 | none |
| Wetting Index mN/m | 64 | 60 | 70 | 52 | 64 | 70 | 36 |
| Anchor Coat Agen | (B-1) | (B-1) | (B-1) | (B-1) | (B-2) | (B-3) | (B-3) |
| Easily-Adhesive Film | | | | | | | |
| Total Light Transmittance % | 92 | 92 | 92 | 92 | 92 | 92 | 92 |
| Haze % | 0.2 | 0.2 | 0.2 | 0.2 | 0.2 | 0.2 | 0.2 |
| Surface Appearance | ◎ | ◎ | ◎ | ◎ | ◎ | ◎ | ◎ |
| Yellowness Index | 0.5 | 0.5 | 0.5 | 0.5 | 0.5 | 0.5 | 0.5 |
| Hard coat-laminated film | | | | | | | |
| Hard Coat Coating Material | (C-1) | (C-1) | (C-1) | (C-1) | (C-1) | (C-1) | (C-1) |
| Hard Coat Thickness μm | 25 | 25 | 25 | 25 | 25 | 25 | 25 |
| Total Light Transmittance % | 91 | 91 | 91 | 91 | 91 | 91 | 91 |
| Haze % | 0.3 | 0.3 | 0.3 | 0.3 | 0.3 | 0.3 | 0.3 |
| Surface Appearance | ◎ | ◎ | ◎ | ◎ | ◎ | ◎ | ◎ |
| Yellowness Index | 0.5 | 0.5 | 0.5 | 0.5 | 0.5 | 0.5 | 0.5 |
| Pencil Hardness | 9H | 9H | 9H | 9H | 9H | 9H | 9H |
| Linear Expansion Coefficient ppm | 17 | 17 | 17 | 17 | 17 | 17 | 17 |
| Cross Cut Test | ◎ | ◎ | ◎ | ○ | ◎ | Δ | XX |

Example 16

A corona discharge treatment was carried out on both surfaces of the poly(meth)acrylimide film obtained in the above Example 3, under the condition of an amount of the treatment of 167 W·min/m² (discharge power: 500 W, length of a discharge electrode: 1 m, line velocity: 3 m/min). The wetting indices were 64 mN/m for both the surfaces. The (B-2) anchor coat agent was then applied to both the corona discharge-treated surfaces by using a film mayer bar-type coating device so that the dry film thickness became 0.5 μm thereby obtaining an easily-adhesive poly(meth)acrylimide film. The obtained easily-adhesive poly(meth)acrylimide film was subjected to the measurement tests of the total light transmittance, the haze, the surface appearance and the color tone by the above methods. The total light transmittance was 92%; the haze was 0.2%; the surface appearance was ◎ for both the surfaces; and the yellowness index was 0.5.

As the coating material for forming a touch surface-side hard coat, the (C-2) was then applied to one surface of the easily-adhesive poly(meth)acrylimide film by using a die-type coating device so that the dry thickness became 25 μm; and, as the coating material for forming a printing surface-side hard coat, the (C-3) was then applied to the other surface of the easily-adhesive poly(meth)acrylimide film by using a die-type coating device so that the dry thickness became 25 μm thereby obtaining a hard coat-laminated film for a touch panel display face plate. The obtained hard coat-laminated film was subjected to the measurement tests of the total light transmittance, the haze, the surface appearance, the color tone, the pencil hardness (750-g load), the linear expansion coefficient (thermal dimensional stability), and the cross cut test (adhesiveness with the hard coat), the finger slidability, the stain resistance (with an oil-based marker), the water contact angle, the abrasion resistance and the printability. The results are shown in Table 4. Here, the tests of the hard coat surfaces are represented, in columns of the Table, as "an evaluation result of a touch surface-side hard coat/an evaluation result of a printing surface-side hard coat". For example, in the column of pencil hardness, since the pencil hardness of a touch surface-side hard coat was 9H, and the pencil hardness of a printing surface-side hard coat was 9H, the result is represented as "9H/9H". Further, the mark "-" means that the test was omitted because the measurement item is a property not being required as a touch surface side or a printing surface side.

Example 17

A hard coat-laminated film was obtained wholly as in Example 16, except for using the coating material (C-4) in place of the coating material (C-3) as the coating material for forming the printing surface-side hard coat on the easily-adhesive film obtained in Example 16. The measurements of the physical properties and the evaluation results are shown in Table 4.

Example 18

A hard coat-laminated film was obtained wholly as in Example 16, except for using the coating material (C-5) in place of the coating material (C-3) as the coating material for forming the printing surface-side hard coat on the easily-adhesive film obtained in Example 16. The measurements of the physical properties and the evaluation results are shown in Table 4.

Example 19

A hard coat-laminated film was obtained wholly as in Example 16, except for making the dry thickness of the touch surface-side hard coat to be 20 μm, and the dry thickness of the printing surface-side hard coat to be 15 μm. The measurements of the physical properties and the evaluation results are shown in Table 4.

TABLE 4

| Hard coat-laminated film | Example 16 | Example 17 | Example 18 | Example 19 |
|---|---|---|---|---|
| Coating Material for Forming Touch Surface-Side Hard Coat | (C-2) | (C-2) | (C-2) | (C-2) |
| Coating Material for Forming Printing Surface-Side Hard Coat | (C-3) | (C-4) | (C-5) | (C-3) |
| Hard Coat Thickness μm | 25/25 | 25/25 | 25/25 | 20/15 |
| Total Light Transmittance % | 91 | 91 | 91 | 91 |
| Haze % | 0.3 | 0.3 | 0.3 | 0.3 |
| Surface Appearance | ⊚/⊚ | ⊚/⊚ | ⊚/⊚ | ⊚/⊚ |
| Yellowness Index | 0.5 | 0.5 | 0.5 | 0.5 |
| Pencil Hardness | 9H/9H | 9H/9H | 9H/9H | 8H/5H |
| Linear Expansion Coefficient ppm | 15 | 15 | 15 | 15 |
| Cross Cut Test | ⊚/⊚ | ⊚/⊚ | ⊚/⊚ | ⊚/⊚ |
| Finger Slidability | ⊚/— | ⊚/— | ⊚/— | ⊚/— |
| Stain Resistance | ⊚/— | ⊚/— | ⊚/— | ⊚/— |
| Water Contact Angle degree | 108/— | 108/— | 108/— | 108/— |
| Scratch Resistance | ⊚/— | ⊚/— | ⊚/— | ⊚/— |
| Printability | —/⊚ | —/⊚ | —/⊚ | —/⊚ |

It was found that Examples 1 to 5 and 7 to 19 according to various embodiments developed physical properties suitable as base materials of touch panel display face plates and transparent conductive substrates. By contrast, Comparative Example 1 was slightly inferior in the total light transmittance, and was not sufficiently good in the surface appearance as well. Comparative Example 2 was inferior in the total light transmittance and the transparency.

Example 20

A film having a thickness of 250 μm was formed by using the (A-1) poly(meth)acrylimide, and using a 50-mm extruder (installed with a W flight screw having an L/D of 29 and a CR of 1.86), a T die having a die width of 680 mm and an apparatus equipped with a mirror-finished roll and a mirror-finished belt, under such conditions that set temperatures of from the extruder to the T die were C1/C2/C3/AD/D1 to D6=280/300/320/320/320 to 320° C.; the lip opening of the T die was 0.5 mm; the screw rotation frequency was 90 rpm; the surface temperature of the mirror-finished roll was 140° C.; the surface temperature of the mirror-finished belt was 120° C.; the pressure of the mirror-finished belt was 1.4 MPa; and the taking-up velocity was 5.6 m/min. For the obtained film, there were carried out the measurement tests of the surface appearance, the total light transmittance, the haze, the pencil hardness (200-g load), the color tone, the linear expansion coefficient (thermal dimensional stability) and the retardation, by the above methods. The results are shown in Table 5.

Examples 21 to 24

Films were formed wholly as in Example 20, except for altering the surface temperature of the mirror-finished roll and the surface temperature of the mirror-finished belt to those indicated in Table 5. The measurements of the physical properties and the evaluation results are shown in Table 5.

Comparative Examples 5 and 6

Films were formed wholly as in Example 20, except for altering the surface temperature of the mirror-finished roll and the surface temperature of the mirror-finished belt to those indicated in Table 6. The measurements of the physical properties and the evaluation results are shown in Table 6.

Comparative Examples 7 and 8

In Comparative Example 7, a film was formed wholly as in Example 20, except for altering the surface temperature of the mirror-finished roll to 220° C.; and in Comparative Example 8, a film was formed wholly as in Example 20, except for altering the surface temperature of the mirror-finished belt to 220° C.

In either of these Comparative Examples, due to exfoliation marks accompanying the peeling-off from the mirror-finished roll, the appearance was remarkably poor. Therefore, the evaluations of physical properties other than the appearance could not be carried out (not shown in Tables).

Example 25

A film having a thickness of 250 μm was formed by using the (A-1) poly(meth)acrylimide, and using a 50-mm extruder (installed with a W flight screw having an L/D of 29 and a CR of 1.86), a T die having a die width of 680 mm and an apparatus equipped with a first mirror-finished roll and a second mirror-finished roll, under such conditions that set temperatures of from the extruder to the T die were C1/C2/C3/AD/D1 to D6=280/300/320/320/320 to 320° C.; the lip opening of the T die was 0.5 mm; the screw rotation frequency was 90 rpm; the surface temperature of the first mirror-finished roll was 140° C.; the surface temperature of the second mirror-finished roll was 40° C.; the pressure between the mirror-finished rolls was 1.4 MPa; and the taking-up velocity was 5.6 m/min. For the obtained film, there were carried out the measurement tests of the surface appearance, the total light transmittance, the haze, the pencil hardness (200-g load), the color tone, the linear expansion coefficient (thermal dimensional stability) and the retardation, by the above methods. The results are shown in Table 5.

Example 26

A film was formed wholly as in Example 22, except for altering the taking-up velocity to 2.6 m/min to make the film thickness to be 550 μm. The measurements of the physical properties and the evaluation results are shown in Table 6.

Example 27

A film was formed wholly as in Example 25, except for altering the taking-up velocity to 2.6 m/min to make the film thickness to be 550 μm. The measurements of the physical properties and the evaluation results are shown in Table 6.

TABLE 5

| | | Example 20 | Example 21 | Example 22 | Example 23 | Example 24 | Example 25 |
|---|---|---|---|---|---|---|---|
| Film Formation Conditions | First Mirror-finished Body | roll | roll | roll | roll | roll | roll |
| | Second Mirror-finished Body | belt | belt | belt | belt | belt | roll |
| | Temperature of the First Mirror-finished body ° C. | 140 | 140 | 140 | 160 | 110 | 140 |
| | Temperature of the Second Mirror-finished body ° C. | 120 | 75 | 40 | 140 | 75 | 40 |
| | Film Thickness μm | 250 | 250 | 250 | 250 | 250 | 250 |
| Evaluation Results | Surface Appearance | ◎ | ◎ | ◎ | ◎ | ◎ | ◎ |
| | Total Light Transmittance % | 93 | 93 | 93 | 93 | 92 | 92 |
| | Haze % | 0.6 | 0.8 | 1.1 | 0.5 | 1.2 | 0.8 |
| | Pencil Hardness | F | F | F | F | F | F |
| | Yellowness Index | 0.5 | 0.5 | 0.5 | 0.5 | 0.5 | 0.5 |
| | Linear Expansion Coefficient ppm | 15 | 15 | 15 | 15 | 15 | 20 |
| | Retardation nm | 15 | 20 | 25 | 15 | 30 | 35 |

TABLE 6

| | | Example 26 | Example 27 | Comparative Example 5 | Comparative Example 6 |
|---|---|---|---|---|---|
| Film Formation Conditions | First Mirror-finished Body | roll | roll | roll | roll |
| | Second Mirror-finished Body | belt | roll | belt | belt |
| | Temperature of the First Mirror-finished body ° C. | 140 | 140 | 75 | 140 |
| | Temperature of the Second Mirror-finished body ° C. | 40 | 40 | 40 | 5 |
| | Film Thickness μm | 550 | 550 | 250 | 250 |
| Evaluation Results | Surface Appearance | ◎ | ◎ | Δ | Δ |
| | Total Light Transmittance % | 92 | 91 | 88 | 90 |
| | Haze % | 1.3 | 1.0 | 2.1 | 1.8 |
| | Pencil Hardnes | F | F | F | F |
| | Yellowness Index | 0.6 | 0.6 | 0.5 | 0.5 |
| | Linear Expansion Coefficient ppm | 10 | 15 | 45 | 45 |
| | Retardation nm | 10 | 20 | 50 | 50 |

It was found that the poly(meth)acrylimide films obtained by the production method according to various embodiments were excellent in surface smoothness, transparency and appearance, high in surface hardness, excellent in color tone, heat resistance and dimensional stability, and further low in retardation. By contrast, Comparative Examples 5 and 6 were insufficient in surface condition, and poorer in transparency, dimensional stability and retardation as well than the Examples. Further Comparative Examples 7 and 8 developed exfoliation marks in the films accompanying peeling-off from the mirror-finished bodies thereby making the appearance remarkably poor.

Example 28

A poly(meth)acrylimide film (A) having a thickness of 250 μm was formed by using the (A-1) poly(meth)acrylimide, and using a 50-mm extruder (installed with a W flight screw having an L/D of 29 and a CR of 1.86), a T die having a die width of 680 mm and an apparatus equipped with a mirror-finished roll and a mirror-finished belt, under such conditions that set temperatures of from the extruder to the T die were C1/C2/C3/AD/D1 to D6=280/300/320/320/320 to 320° C.; the lip opening of the T die was 0.5 mm; the screw rotation frequency was 90 rpm; the surface temperature of the mirror-finished roll was 140° C.; the surface temperature of the mirror-finished belt was 40° C.; the pressure of the mirror-finished belt was 1.4 MPa; and the taking-up velocity was 5.6 m/min.

On one surface of the film (A), a corona discharge treatment was carried out, under the condition of an amount of the treatment of 167 W·min/m$^2$ (discharge power: 500 W, length of a discharge electrode: 1 m, line velocity: 3 m/min). A coating material was obtained by diluting the (B-1) anchor coat agent (i.e., a silane coupling agent having amino groups) with a modified alcohol solvent "a mixed solvent of ethanol/isopropyl alcohol/methanol=80/20/1 (volume ratio)" so that the concentration of the anchor coat agent became 1 mass %. This coating material was then applied to the corona discharge-treated surface so that the dry film thickness became 0.5 μm thereby obtaining an easily-adhesive poly(meth)acrylimide film. The obtained easily-adhesive poly(meth)acrylimide film was subjected to the measurement tests of the surface appearance, the total light transmittance, the haze and the color tone by the above methods.

The coating material (C-1) was then applied to the easily-adhesive surface of the easily-adhesive poly(meth)acrylimide film by using a die-type coating device so that the dry thickness became 25 μm thereby obtaining a hard coat-laminated film. The obtained hard coat-laminated film was subjected to the measurement tests of the surface appearance, the total light transmittance, the haze, the color tone, the pencil hardness (750-g load), the cross cut test (adhesiveness with the hard coat) and the linear expansion coefficient (thermal dimensional stability). The results are shown in Table 7.

Examples 29 to 31, and Reference Example 2

The corona discharge treatment, formations of easily-adhesive poly(meth)acrylimide films and hard coat-laminated films, and the physical property measurements thereof were carried out, wholly as in Example 28, except for altering the amounts of the corona discharge treatment to values indicated in Table 7. The results are shown in Table 7.

Reference Examples 3 to 8

The corona discharge treatment, formations of easily-adhesive poly(meth)acrylimide films and hard coat-laminated films, and the physical property measurements thereof were carried out, wholly as in Example 28, except for using anchor coat agents indicated in Table 8 in place of the (B-1) anchor coat agent. The results are shown in Table 8.

Examples 32 to 34

The corona discharge treatment, formations of easily-adhesive poly(meth)acrylimide films and hard coat-laminated films, and the physical property measurements of the hard coat-laminated films were carried out, wholly as in Example 28, except for altering the dry thicknesses of the hard coats formed on the easily-adhesive poly(meth)acrylimide film obtained in Example 28 to values indicated in Table 9. The results are shown in Table 9.

TABLE 7

|  | Example 28 | Example 29 | Example 30 | Example 31 | Reference Example 2 |
|---|---|---|---|---|---|
| Amount of Corona Discharge Treatment W · min/m² | 167 | 120 | 400 | 80 | none |
| Wetting Index mN/m | 64 | 60 | 70 | 52 | 36 |
| Type of Silane Coupling Agent | (B-1) | (B-1) | (B-1) | (B-1) | (B-1) |
| Easily-Adhesive Film |  |  |  |  |  |
| Surface Appearance | ◎ | ◎ | ◎ | ◎ | ◎ |
| Total Light Transmittance % | 92 | 92 | 92 | 92 | 92 |
| Haze % | 0.2 | 0.2 | 0.2 | 0.2 | 0.2 |
| Yellowness Index | 0.5 | 0.5 | 0.5 | 0.5 | 0.5 |
| Hard coat-laminated film |  |  |  |  |  |
| Hard Coat Coating Material | (C-1) | (C-1) | (C-1) | (C-1) | (C-1) |
| Hard Coat Thickness μm | 25 | 25 | 25 | 25 | 25 |
| Surface Appearance | ◎ | ◎ | ◎ | ◎ | ◎ |
| Total Light Transmittance % | 91 | 91 | 91 | 91 | 91 |
| Haze % | 0.3 | 0.3 | 0.3 | 0.3 | 0.3 |
| Yellowness Index | 0.5 | 0.5 | 0.5 | 0.5 | 0.5 |
| Pencil Hardness | 9H | 9H | 9H | 9H | 9H |
| Cross Cut Test | ◎ | ◎ | ◎ | ○ | X |
| Linear Expansion Coefficient ppm | 17 | 17 | 17 | 17 | 17 |

TABLE 8

|  | Reference Example 3 | Reference Example 4 | Reference Example 5 | Reference Example 6 | Reference Example 7 | Reference Example 8 |
|---|---|---|---|---|---|---|
| Amount of Corona Discharge Treatment W · min/m2 | 167 | 167 | 167 | 167 | 167 | 167 |
| Wetting Index mN/m | 64 | 64 | 64 | 64 | 64 | 64 |
| Type of Silane Coupling Agent | (b-1) | (b-2) | (b-3) | (b-4) | (b-5) | (b-6) |
| Easily-Adhesive Film |  |  |  |  |  |  |
| Surface Appearance | ◎ | ◎ | ◎ | ◎ | ◎ | ◎ |
| Total Light Transmittance % | 92 | 92 | 92 | 92 | 92 | 92 |
| Haze % | 0.2 | 0.2 | 0.2 | 0.2 | 0.2 | 0.2 |
| Yellowness Index | 0.5 | 0.5 | 0.5 | 0.5 | 0.5 | 0.5 |
| Hard coat-laminated film |  |  |  |  |  |  |
| Hard Coat Coating Material | (C-1) | (C-1) | (C-1) | (C-1) | (C-1) | (C-1) |
| Hard Coat Thickness μm | 25 | 25 | 25 | 25 | 25 | 25 |
| Surface Appearance | ◎ | ◎ | ◎ | ◎ | ◎ | ◎ |
| Total Light Transmittance % | 91 | 91 | 91 | 91 | 91 | 91 |
| Haze % | 0.3 | 0.3 | 0.3 | 0.3 | 0.3 | 0.3 |
| Yellowness Index | 0.5 | 0.5 | 0.5 | 0.5 | 0.5 | 0.5 |
| Pencil Hardness | 9H | 9H | 9H | 9H | 9H | 9H |
| Cross Cut Test | X | X | X | X | X | X |
| Linear Expansion Coefficient ppm | 17 | 17 | 17 | 17 | 17 | 17 |

TABLE 9

| Hard coat-laminated film | Example 32 | Example 33 | Example 34 |
|---|---|---|---|
| Hard Coat Coating Material | (C-1) | (C-1) | (C-1) |
| Hard Coat Thickness μm | 35 | 20 | 15 |
| Surface Appearance | ◎ | ◎ | ◎ |
| Total Light Transmittarice % | 91 | 91 | 91 |
| Haze % | 0.3 | 0.3 | 0.3 |
| Yellowness Index | 0.5 | 0.5 | 0.5 |
| Pencil Hardness | 9H | 8H | 5H |
| Cross Cut Test | ◎ | ◎ | ◎ |
| Linear Expansion Coefficient ppm | 16 | 18 | 20 |

It was found that the Examples according to various embodiments were excellent in appearance, transparency, color tone, pencil hardness, adhesiveness with the hard coat, and dimensional stability. By contrast, Reference Example 2, in which the amount of the corona discharge treatment was zero, that is, no corona discharge treatment was carried out, and Reference Examples 3 to 8, in which no silane coupling agent having amino groups was used, and other silane coupling agents were instead used as an anchor coat agent, were inferior in the adhesiveness with the hard coat to the Examples.

Example 35

On both surfaces of the film (A), a corona discharge treatment was carried out, under the condition of an amount of the treatment of 167 W·min/m² (discharge power: 500 W, length of a discharge electrode: 1 m, line velocity: 3 m/min). The wetting indices were 64 mN/m for both the surfaces. A coating material was obtained by diluting the (B-1) anchor coat agent (i.e., a silane coupling agent having amino groups) with a modified alcohol solvent "a mixed solvent of ethanol/isopropyl alcohol/methanol=80/20/1 (volume ratio)" so that the concentration of the anchor coat agent became 1 mass %. This coating material was then applied to both the corona discharge-treated surfaces by using a film mayer bar-type coating device so that the dry film thickness became 0.5 μm thereby obtaining an easily-adhesive poly(meth)acrylimide film. The obtained easily-adhesive poly(meth)acrylimide film was subjected to the measurement tests of the surface appearance, the total light transmittance, the haze and the color tone by the above methods. The surface appearance was ◎ for both the surfaces; the total light transmittance was 92%; the haze was 0.2%; and the yellowness index was 0.5.

As the coating material for forming the touch surface-side hard coat, the (C-2) was then applied to one surface of the easily-adhesive poly(meth)acrylimide film by using a die-type coating device so that the dry thickness became 25 μm; and, as the coating material for forming the printing surface-side hard coat, the (C-3) was then applied to the other surface of the easily-adhesive poly(meth)acrylimide film by using a die-type coating device so that the dry thickness became 25 μm thereby obtaining a hard coat-laminated film for a touch panel display face plate. The obtained hard coat-laminated film was subjected to the measurement tests of the surface appearance, the total light transmittance, the haze, the color tone, the pencil hardness (750-g load), the cross cut test (adhesiveness with the hard coat), the linear expansion coefficient (thermal dimensional stability), the finger slidability, the stain resistance (with an oil-based marker), the water contact angle, the abrasion resistance and the printability. The results are shown in Table 10. Here, the tests of the hard coat surfaces are represented, in columns of the Table, as "an evaluation result of a touch surface-side hard coat/an evaluation result of a printing surface-side hard coat". For example, in the column of pencil hardness, since the pencil hardness of a touch surface-side hard coat was 9H, and the pencil hardness of a printing surface-side hard coat was 9H, the result is represented as "9H/9H". Further, the mark "-" means that the test was omitted because the measurement item is a property not being required as a touch surface side or a printing surface side.

Example 36

A hard coat-laminated film was obtained wholly as in Example 35, except for using the coating material (C-4) in place of the coating material (C-3) as the coating material for forming the printing surface-side hard coat on the easily-adhesive film obtained in Example 35. The measurements of the physical properties and the evaluation results are shown in Table 10.

Example 37

A hard coat-laminated film was obtained wholly as in Example 35, except for using the coating material (C-5) in place of the coating material (C-3) as the coating material for forming the printing surface-side hard coat on the easily-adhesive film obtained in Example 35. The measurements of the physical properties and the evaluation results are shown in Table 10.

TABLE 10

| Hard coat-laminated film | Example 35 | Example 36 | Example 37 |
|---|---|---|---|
| Coating Material for Forming Touch Surface-Side Hard Coat | (C-2) | (C-2) | (C-2) |
| Coating Material for Forming Printing Surface-Side Hard Coat | (C-3) | (C-4) | (C-5) |
| Hard Coat Thickness μm | 25/25 | 25/25 | 25/25 |
| Surface Appearance | ◎/◎ | ◎/◎ | ◎/◎ |
| Total Light Transmittance % | 91 | 91 | 91 |
| Haze % | 0.3 | 0.3 | 0.3 |
| Yellowness Index | 0.5 | 0.5 | 0.5 |
| Pencil Hardness | 9H/9H | 9H/9H | 9H/9H |
| Cross Cut Test | ◎/◎ | ◎/◎ | ◎/◎ |
| Linear Expansion Coefficient ppm | 15 | 15 | 15 |
| Finger slidability | ◎/— | ◎/— | ◎/— |
| Stain Resistance | ◎/— | ◎/— | ◎/— |
| Water Contact Angle degree | 108/— | 108/— | 108/— |
| Scratch Resistance | ◎/— | ◎/— | ◎/— |
| Printabilitya | —/◎ | —/◎ | —/◎ |

It was found that the hard coat-laminated films according to Examples 35 to 37 according to various embodiments developed physical properties suitable for touch panel display face plates.

Therefore, according to various embodiments, there is provided a poly(meth)acrylimide film excellent in surface smoothness, transparency and appearance, and low in retardation. The poly(meth)acrylimide film is often high in surface hardness and rigidity, and excellent in color tone, heat resistance and dimensional stability.

The poly(meth)acrylimide film can further provide an easily-adhesive film excellent in the adhesive strength with the hard coat.

These films are suitably used as base materials of touch panel display face plates and transparent conductive substrates, due to the above properties. These films also can suitably be used as members of image display apparatuses such as liquid crystal displays, plasma displays and electroluminescence displays.

These films can further provide a hard coat-laminated film high in transparency, surface hardness and rigidity, also excellent in heat resistance and dimensional stability, and good in color tone as well.

According to at least one embodiment, FIG. 1 illustrates the following:
1: T DIE
2: MOLTEN FILM
3: MIRROR-FINISHED ROLL
4: MIRROR-FINISHED BELT
5: A PAIR OF BELT ROLLERS

The invention claimed is:

1. A method for producing a poly(meth)acrylimide film, comprising the steps of:
  continuously extruding, with an apparatus equipped with an extruder and a T die, a molten film of a poly(meth)acrylimide from the T die;
  feeding and pressing the molten film of the poly(meth)acrylimide between a first rotating or circulating mirror-finished body and a second rotating or circulating mirror-finished body wherein the first mirror-finished body is a rotating mirror-finished roll, and the second mirror-finished body is a mirror-finished belt circulating along an outer peripheral surface of the mirror-finished roll; and
  delivering the molten film to a following transfer roll while making the molten film to be held on the first rotating or circulating mirror-finished body,
  wherein the first rotating or circulating mirror-finished body has a surface temperature of 100° C. or higher and 200° C. or lower,
  wherein the second rotating or circulating mirror-finished body has a surface temperature of 20° C. or higher and less than 200° C., and wherein the surface temperature of the first rotating or circulating mirror-finished body is higher than the surface temperature of the second rotating or circulating mirror-finished body.

2. A method for producing an easily-adhesive poly(meth)acrylimide film, the method comprising the steps of:
  (1) producing a poly(meth)acrylimide film by the method according to claim 1;
  (2) subjecting at least one surface of the poly(meth)acrylimide film obtained in the step (1) to a corona discharge treatment; and
  (3) forming, as an easily-adhesive surface, an anchor coat comprising a silane coupling agent having an amino group on the treated surface of the poly(meth)acrylimide film having been subjected to the corona discharge treatment in the step (2).

3. The method according to claim 1, wherein the surface temperature of the first rotating or circulating mirror-finished body is 20 to 100° C. higher than the surface temperature of the second rotating or circulating mirror-finished body.

4. The method according to claim 2, wherein the surface temperature of the first rotating or circulating mirror-finished body is 20 to 100° C. higher than the surface temperature of the second rotating or circulating mirror-finished body.

5. The method according to claim 1, wherein the poly(meth)acrylimide has a glass transition temperature of 150° C. or higher.

6. The method according to claim 2, wherein the poly(meth)acrylimide has a glass transition temperature of 150° C. or higher.

7. A method for producing a hard coat-laminated film, comprising the steps of:
  (1) producing a poly(meth)acrylimide film by the method according to claim 1; and
  (2) forming a hard coat on at least one surface of the poly(meth)acrylimide film obtained in the step (1).

8. A method for producing a hard coat-laminated film, comprising the steps of:
  (1) producing an easily-adhesive poly(meth)acrylimide film by the method according to claim 2; and
  (2) forming a hard coat on the easily-adhesive surface of the easily-adhesive poly(meth)acrylimide film obtained in the step (1).

9. A method for producing an image display apparatus, which comprises using installing, as a member of the image display apparatus, a poly(meth)acrylimide film obtained by the method according to claim 1 into the image display apparatus.

10. A method for producing an image display apparatus, which comprises installing, as a member of the image display apparatus, an easily-adhesive poly(meth)acrylimide film obtained by the method according to claim 2 into the image display apparatus.

* * * * *